(12) United States Patent
Tibor

(10) Patent No.: US 12,131,315 B2
(45) Date of Patent: *Oct. 29, 2024

(54) ELECTRONIC TRANSACTION VERIFICATION SYSTEM WITH BIOMETRIC AUTHENTICATION

(71) Applicant: Biometric Payment Solutions, LLC, St. Johns, FL (US)

(72) Inventor: Joan Lee Tibor, Waycross, GA (US)

(73) Assignee: Biometric Payment Solutions, LLC, St. Johns, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,263

(22) Filed: Sep. 6, 2023

(65) Prior Publication Data

US 2024/0104554 A1 Mar. 28, 2024

Related U.S. Application Data

(63) Continuation of application No. 17/491,231, filed on Sep. 30, 2021, now Pat. No. 11,783,320, which is a
(Continued)

(51) Int. Cl.
*G06Q 20/36* (2012.01)
*G06Q 20/04* (2012.01)
(Continued)

(52) U.S. Cl.
CPC ....... *G06Q 20/3674* (2013.01); *G06Q 20/042* (2013.01); *G06Q 20/206* (2013.01);
(Continued)

(58) Field of Classification Search
CPC . G06Q 20/3674; G06Q 20/042; G06Q 20/206
(Continued)

(56) References Cited

U.S. PATENT DOCUMENTS 4,048,618 A 9/1977 Hendry
4,109,238 A 8/1978 Creekmore
(Continued)

FOREIGN PATENT DOCUMENTS

CN 1760904 A 4/2006
GB 2429092 2/2007
(Continued)

OTHER PUBLICATIONS

International Search Report & Written Opinion in PCT/US2011/58460 dated Mar. 16, 2012.
(Continued)

*Primary Examiner* — Allyson N Trail
(74) *Attorney, Agent, or Firm* — Knobbe, Martens, Olson, & Bear, LLP

(57) ABSTRACT

An electronic transaction verification system for use with transaction tokens such as checks, credit cards, debit cards, and smart cards that gathers and transmits information about the transaction token and biometric data. Customers can be enrolled in the system by receiving customer information that includes at least a biometric datum, associating the received customer information with a transaction instrument issued to the customers and storing the received customer information and the issued transaction instrument information in a database for future reference.

24 Claims, 10 Drawing Sheets

Related U.S. Application Data continuation of application No. 16/882,079, filed on May 22, 2020, now Pat. No. 11,138,594, which is a continuation of application No. 16/409,609, filed on May 10, 2019, now Pat. No. 10,664,834, which is a continuation of application No. 15/833,406, filed on Dec. 6, 2017, now Pat. No. 10,304,054, which is a continuation of application No. 15/377,412, filed on Dec. 13, 2016, now Pat. No. 9,846,875, which is a continuation of application No. 14/611,571, filed on Feb. 2, 2015, now abandoned, which is a continuation of application No. 13/934,864, filed on Jul. 3, 2013, now Pat. No. 9,141,951, which is a continuation of application No. 12/497,512, filed on Jul. 2, 2009, now Pat. No. 8,485,442.

(51) Int. Cl.
  *G06Q 20/20* (2012.01)
  *G06Q 20/34* (2012.01)
  *G06Q 20/38* (2012.01)
  *G06Q 20/40* (2012.01)

(52) U.S. Cl.
  CPC ........... *G06Q 20/34* (2013.01); *G06Q 20/382* (2013.01); *G06Q 20/401* (2013.01); *G06Q 20/40145* (2013.01)

(58) Field of Classification Search
  USPC .......................................................... 705/44
  See application file for complete search history.

(56) References Cited

U.S. PATENT DOCUMENTS

| | | |
|---|---|---|
| 4,187,498 A | 2/1980 | Creekmore |
| 4,213,038 A | 7/1980 | Silverman et al. |
| 4,253,086 A | 2/1981 | Szwarcbier |
| 4,315,309 A | 2/1982 | Coli |
| 4,582,985 A | 4/1986 | Lofberg |
| 4,672,377 A | 6/1987 | Murphy et al. |
| 4,947,443 A | 8/1990 | Costello |
| 4,993,068 A | 2/1991 | Piosenka et al. |
| 4,995,086 A | 2/1991 | Lilley et al. |
| 5,180,901 A | 1/1993 | Hiramatsu |
| 5,305,196 A | 4/1994 | Deaton et al. |
| 5,321,765 A | 6/1994 | Costello |
| 5,325,294 A | 6/1994 | Keene |
| 5,444,794 A | 8/1995 | Uhland, Sr. |
| 5,484,988 A | 1/1996 | Hills et al. |
| 5,509,083 A | 4/1996 | Abtahi et al. |
| 5,530,232 A | 6/1996 | Taylor |
| 5,576,952 A | 11/1996 | Stutman et al. |
| 5,578,808 A | 11/1996 | Taylor |
| 5,590,038 A | 12/1996 | Pitroda |
| 5,592,377 A | 1/1997 | Lipkin |
| 5,594,226 A | 1/1997 | Steger |
| 5,598,474 A | 1/1997 | Johnson |
| 5,602,933 A | 2/1997 | Blackwell et al. |
| 5,612,870 A | 3/1997 | Welner |
| 5,613,012 A | 3/1997 | Hoffman et al. |
| 5,623,522 A | 4/1997 | Ito |
| 5,657,389 A | 8/1997 | Houvener |
| 5,668,874 A | 9/1997 | Kristal et al. |
| 5,668,897 A | 9/1997 | Stolfo |
| 5,677,955 A | 10/1997 | Doggett et al. |
| 5,703,344 A | 12/1997 | Bezy |
| 5,745,046 A | 4/1998 | Itsumi et al. |
| 5,748,765 A | 5/1998 | Takhar |
| 5,748,780 A | 5/1998 | Stolfo |
| 5,764,789 A | 6/1998 | Pare, Jr. et al. |
| 5,772,585 A | 6/1998 | Lavin et al. |
| 5,774,879 A | 6/1998 | Custy et al. |
| 5,789,727 A | 8/1998 | Teradaira et al. |
| 5,789,733 A | 8/1998 | Jachimowicz et al. |
| 5,790,674 A | 8/1998 | Houvener et al. |
| 5,799,092 A | 8/1998 | Kristal et al. |
| 5,802,199 A | 9/1998 | Pare, Jr. et al. |
| 5,815,252 A | 9/1998 | Price-Francis |
| 5,815,598 A | 9/1998 | Hara et al. |
| 5,818,955 A | 10/1998 | Smithies et al. |
| 5,826,245 A | 10/1998 | Sandberg |
| 5,832,464 A | 11/1998 | Houvener et al. |
| 5,834,747 A | 11/1998 | Cooper |
| 5,852,670 A | 12/1998 | Setlak et al. |
| 5,867,688 A | 2/1999 | Simmon et al. |
| 5,876,926 A | 3/1999 | Beecham |
| 5,884,271 A | 3/1999 | Pitroda |
| 5,892,824 A | 4/1999 | Beatson et al. |
| 5,897,625 A | 4/1999 | Gustin et al. |
| 5,897,989 A | 4/1999 | Beecham |
| 5,924,074 A | 7/1999 | Evans |
| 5,974,146 A | 10/1999 | Randle et al. |
| 5,987,439 A | 11/1999 | Gustin et al. |
| 6,018,713 A | 1/2000 | Coli et al. |
| 6,032,119 A | 2/2000 | Brown et al. |
| 6,032,137 A | 2/2000 | Ballard |
| 6,038,553 A | 3/2000 | Hyde, Jr. |
| 6,041,315 A | 3/2000 | Pollin |
| 6,044,353 A | 3/2000 | Pugliese, III |
| 6,072,894 A | 6/2000 | Payne |
| 6,073,106 A | 6/2000 | Rozen et al. |
| 6,091,835 A | 7/2000 | Smithies et al. |
| 6,105,011 A | 8/2000 | Morrison, Jr. |
| 6,131,811 A | 10/2000 | Gangi |
| 6,145,738 A | 11/2000 | Stinson et al. |
| 6,149,056 A | 11/2000 | Stinson et al. |
| 6,164,528 A | 12/2000 | Hills et al. |
| 6,193,152 B1 | 2/2001 | Fernando et al. |
| 6,208,264 B1 | 3/2001 | Bradney et al. |
| 6,226,378 B1 | 5/2001 | Quattrocchi |
| 6,270,011 B1 | 8/2001 | Gottfried |
| 6,293,642 B1 | 9/2001 | Gangi |
| 6,308,890 B1 | 10/2001 | Cooper |
| 6,376,251 B1 | 4/2002 | Braun et al. |
| 6,390,362 B1 | 5/2002 | Martin |
| 6,402,029 B1 | 6/2002 | Gangi |
| 6,424,249 B1 | 7/2002 | Houvener |
| 6,438,601 B1 | 8/2002 | Hardy |
| 6,463,417 B1 | 10/2002 | Schoenberg |
| 6,473,519 B1 | 10/2002 | Pidhirny et al. |
| 6,581,012 B1 | 6/2003 | Aryev et al. |
| 6,581,042 B2 | 6/2003 | Pare, Jr. et al. |
| 6,592,029 B2 | 7/2003 | Brikho |
| 6,695,203 B2 | 2/2004 | Iki et al. |
| 6,695,204 B1 | 2/2004 | Stinson et al. |
| 6,698,653 B1 | 3/2004 | Diamond et al. |
| 6,707,857 B1 | 3/2004 | Cairns |
| 6,728,397 B2 | 4/2004 | McNeal |
| 6,755,344 B1 | 6/2004 | Mollett et al. |
| 6,764,005 B2 | 7/2004 | Cooper |
| 6,898,299 B1 | 5/2005 | Brooks |
| 6,938,022 B1 | 8/2005 | Singhal |
| 6,938,821 B2 | 9/2005 | Gangi |
| 6,963,241 B2 | 11/2005 | Lindell |
| 6,983,882 B2 | 1/2006 | Cassone |
| 7,003,142 B1 | 2/2006 | Kruse |
| 7,047,204 B1 | 5/2006 | Wood |
| 7,058,585 B1 | 6/2006 | Wood |
| 7,083,087 B1 | 8/2006 | Gangi |
| 7,083,094 B2 | 8/2006 | Cooper |
| 7,107,220 B2 | 9/2006 | Novack et al. |
| 7,110,987 B2 | 9/2006 | Engelhart |
| 7,209,886 B2 | 4/2007 | Kimmel |
| 7,231,068 B2 | 6/2007 | Tibor |
| 7,251,828 B1 | 7/2007 | Hamid et al. |
| 7,269,737 B2 | 9/2007 | Robinson |
| 7,272,723 B1 | 9/2007 | Abbott |
| 7,278,025 B2 | 10/2007 | Saito et al. |
| 7,314,164 B2 | 1/2008 | Bonalle |
| 7,318,550 B2 | 1/2008 | Bonalle et al. |
| 7,330,571 B2 | 2/2008 | Svensson et al. |
| 7,334,732 B2 | 2/2008 | Cooper |

(56) References Cited

U.S. PATENT DOCUMENTS

| | | |
|---|---|---|
| 7,336,185 B2 | 2/2008 | Turner et al. |
| 7,349,557 B2 | 3/2008 | Tibor |
| 7,349,885 B2 | 3/2008 | Gangi |
| 7,357,312 B2 | 4/2008 | Gangi |
| 7,421,398 B2 | 9/2008 | Kimmel |
| 7,421,399 B2 | 9/2008 | Kimmel |
| 7,451,481 B2 | 11/2008 | Bauer et al. |
| 7,516,886 B2 | 4/2009 | Gangi |
| 7,530,495 B2 | 5/2009 | Cooper |
| 7,533,408 B1 | 5/2009 | Arnouse |
| 7,673,327 B1 | 3/2010 | Polis et al. |
| 7,708,198 B2 | 5/2010 | Gangi |
| 7,712,658 B2 | 5/2010 | Gangi |
| 7,724,137 B2 | 5/2010 | Page |
| 7,812,779 B2 | 10/2010 | Turner et al. |
| 7,828,208 B2 | 11/2010 | Gangi |
| 7,864,992 B2 | 1/2011 | Riedijk et al. |
| 7,886,000 B1 | 2/2011 | Polis et al. |
| 7,908,647 B1 | 3/2011 | Polis et al. |
| 8,090,787 B2 | 1/2012 | Polis et al. |
| 8,095,592 B2 | 1/2012 | Polis et al. |
| 8,108,460 B2 | 1/2012 | Polis et al. |
| 8,112,476 B2 | 2/2012 | Polis et al. |
| 8,122,080 B2 | 2/2012 | Polis et al. |
| 8,150,772 B2 | 4/2012 | Mardikar et al. |
| 8,156,183 B2 | 4/2012 | Polis et al. |
| 8,296,360 B2 | 10/2012 | Polis et al. |
| 8,353,705 B2 | 1/2013 | Dobson et al. |
| 8,438,223 B2 | 5/2013 | Polis et al. |
| 8,458,256 B2 | 6/2013 | Polis et al. |
| 8,458,292 B2 | 6/2013 | Polis et al. |
| 8,458,347 B2 | 6/2013 | Polis et al. |
| 8,468,202 B2 | 6/2013 | Polis et al. |
| 8,485,442 B2 | 7/2013 | McNeal |
| 8,678,273 B2 | 3/2014 | McNeal |
| 8,903,142 B2 | 12/2014 | Storm et al. |
| 8,922,406 B2 | 12/2014 | Jansson |
| 8,959,156 B2 | 2/2015 | Polis et al. |
| 8,990,340 B1 | 3/2015 | Polis et al. |
| 8,996,654 B2 | 3/2015 | Polis et al. |
| 9,141,951 B2 | 9/2015 | McNeal |
| 9,152,841 B1 | 10/2015 | Riedijk |
| 9,195,878 B2 | 11/2015 | Weber |
| 9,323,975 B2 | 4/2016 | Riedijk et al. |
| 9,331,708 B2 | 5/2016 | Sundblad |
| 9,350,374 B2 | 5/2016 | Sundblad et al. |
| 9,366,843 B2 | 6/2016 | Prabhakar et al. |
| 9,383,876 B2 | 7/2016 | Riedijk et al. |
| 9,442,273 B2 | 9/2016 | Prabhakar et al. |
| 9,449,212 B2 | 9/2016 | Riedijk |
| 9,449,214 B2 | 9/2016 | Lundahl |
| 9,460,576 B2 | 10/2016 | Riedijk |
| 9,477,872 B2 | 10/2016 | Sarve et al. |
| 9,489,559 B2 | 11/2016 | Weber et al. |
| 9,507,992 B1 | 11/2016 | Lundahl |
| 9,508,122 B2 | 11/2016 | Setterberg et al. |
| 9,514,349 B2 | 12/2016 | Weber et al. |
| 9,514,352 B2 | 12/2016 | Setterberg et al. |
| 9,519,819 B2 | 12/2016 | Hansen et al. |
| 9,521,314 B2 | 12/2016 | Setterberg |
| 9,524,416 B1 | 12/2016 | Rommel |
| 9,576,177 B2 | 2/2017 | Lundahl |
| 9,582,704 B2 | 2/2017 | Jägemalm et al. |
| 9,582,716 B2 | 2/2017 | Prabhakar |
| 9,589,171 B1 | 3/2017 | Larsson et al. |
| 9,600,705 B2 | 3/2017 | Riedijk |
| 9,600,706 B2 | 3/2017 | Hansen et al. |
| 9,600,707 B1 | 3/2017 | Ramberg et al. |
| 9,602,123 B2 | 3/2017 | Sundblad et al. |
| 9,613,428 B2 | 4/2017 | Setterberg et al. |
| 9,646,193 B2 | 5/2017 | Setterberg et al. |
| 9,672,341 B2 | 6/2017 | Danikhno et al. |
| 9,672,401 B2 | 6/2017 | Riedijk et al. |
| 9,672,403 B2 | 6/2017 | Tuneld et al. |
| 9,672,407 B2 | 6/2017 | Lundahl |
| 9,672,409 B2 | 6/2017 | Jonsson et al. |
| 9,684,812 B2 | 6/2017 | Riedijk et al. |
| 9,710,690 B1 | 7/2017 | Carling et al. |
| 9,773,150 B1 | 9/2017 | Setterberg |
| 9,773,153 B1 | 9/2017 | Slottner |
| 9,779,278 B2 | 10/2017 | Nilsson |
| 9,779,281 B2 | 10/2017 | Hansen et al. |
| 9,779,282 B1 | 10/2017 | Ghavanini |
| 9,792,421 B1 | 10/2017 | Weber |
| 9,805,244 B2 | 10/2017 | Lundahl |
| 9,811,708 B2 | 11/2017 | Carling et al. |
| 9,818,106 B2 | 11/2017 | Weber et al. |
| 9,842,242 B1 | 12/2017 | Larsson et al. |
| 9,842,243 B2 | 12/2017 | Lundahl |
| 9,842,244 B2 | 12/2017 | Lundahl |
| 9,842,245 B1 | 12/2017 | Setterberg et al. |
| 9,846,875 B2 | 12/2017 | McNeal |
| 9,864,895 B1 | 1/2018 | Larsson et al. |
| 9,881,197 B2 | 1/2018 | Ramberg et al. |
| 9,898,640 B2 | 2/2018 | Ghavanini |
| 9,904,841 B2 | 2/2018 | Thörnblom et al. |
| 9,911,026 B2 | 3/2018 | Andesson |
| 9,922,231 B1 | 3/2018 | Riedijk et al. |
| 9,934,418 B2 | 4/2018 | Mienko et al. |
| 9,934,421 B1 | 4/2018 | Nilsson |
| 9,946,943 B2 | 4/2018 | Ivanisov et al. |
| 9,953,204 B2 | 4/2018 | Sundblad et al. |
| 9,971,434 B2 | 5/2018 | Setterberg et al. |
| 9,971,925 B2 | 5/2018 | Setterberg et al. |
| 9,971,926 B2 | 5/2018 | Riedijk et al. |
| 9,971,930 B2 | 5/2018 | Östlund |
| 9,977,945 B2 | 5/2018 | Lundahl et al. |
| 9,984,274 B2 | 5/2018 | Ramberg et al. |
| 10,304,054 B2 | 5/2019 | McNeal |
| 10,664,834 B2 | 5/2020 | McNeal |
| 10,891,459 B2 | 1/2021 | Lundahl |
| 10,896,311 B2 | 1/2021 | Hansen |
| 10,936,840 B2 | 3/2021 | Mienko et al. |
| 11,138,594 B2 | 10/2021 | Tibor |
| 11,783,320 B2 | 10/2023 | Tibor |
| 2002/0095389 A1 | 7/2002 | Gaines |
| 2002/0095588 A1 | 7/2002 | Shigematsu |
| 2002/0113122 A1 | 8/2002 | Brikho |
| 2003/0074317 A1 | 4/2003 | Hofi |
| 2003/0128866 A1 | 7/2003 | McNeal |
| 2003/0149661 A1 | 8/2003 | Mitchell et al. |
| 2004/0026500 A1 | 2/2004 | Brikho |
| 2004/0050930 A1 | 3/2004 | Rowe |
| 2004/0195314 A1 | 10/2004 | Lee |
| 2004/0234117 A1 | 11/2004 | Tibor |
| 2006/0000891 A1 | 1/2006 | Bonalle et al. |
| 2006/0010007 A1 | 1/2006 | Denman et al. |
| 2006/0064380 A1 | 3/2006 | Zukerman |
| 2006/0273436 A1 | 12/2006 | Naifeh et al. |
| 2007/0043594 A1 | 2/2007 | Lavergne |
| 2007/0078780 A1 | 4/2007 | Tran et al. |
| 2007/0101419 A1 | 5/2007 | Dawson |
| 2007/0156436 A1 | 7/2007 | Fisher |
| 2007/0168232 A1 | 7/2007 | Kimmel |
| 2007/0208662 A1 | 9/2007 | Jeronimus et al. |
| 2007/0260484 A1 | 11/2007 | Kimmel |
| 2008/0041940 A1 | 2/2008 | Weeks |
| 2008/0072064 A1 | 3/2008 | Franchi |
| 2008/0156866 A1 | 7/2008 | McNeal |
| 2008/0290157 A1 | 11/2008 | Robinson |
| 2009/0055924 A1 | 2/2009 | Trotter |
| 2009/0083179 A1 | 3/2009 | Gustave et al. |
| 2009/0100499 A1 | 4/2009 | Bauer et al. |
| 2009/0166406 A1 | 7/2009 | Pigg et al. |
| 2009/0171851 A1 | 7/2009 | Beenau et al. |
| 2009/0173785 A1 | 7/2009 | Cooper |
| 2009/0319789 A1 | 12/2009 | Wilson et al. |
| 2010/0042846 A1 | 2/2010 | Trotter et al. |
| 2010/0181380 A1 | 7/2010 | Trotter |
| 2010/0250290 A1 | 9/2010 | Lefkowitz |
| 2010/0274634 A1 | 10/2010 | Ifrah |
| 2011/0000961 A1 | 1/2011 | McNeal |
| 2012/0054842 A1 | 3/2012 | Rodriguez et al. |
| 2012/0109829 A1 | 5/2012 | McNeal |

(56) References Cited

U.S. PATENT DOCUMENTS

| | | |
|---|---|---|
| 2013/0002400 A1 | 1/2013 | Tibor |
| 2013/0002401 A1 | 1/2013 | Tibor |
| 2014/0025583 A1 | 1/2014 | McNeal |
| 2014/0089197 A1 | 3/2014 | Talbert |
| 2015/0317636 A1 | 11/2015 | McNeal |
| 2017/0186012 A1 | 6/2017 | McNeal |
| 2017/0316406 A1 | 11/2017 | McNeal |
| 2018/0096346 A1 | 4/2018 | McNeal |
| 2019/0333050 A1 | 10/2019 | McNeal |
| 2021/0049587 A1 | 2/2021 | Tibor |

FOREIGN PATENT DOCUMENTS

| | | |
|---|---|---|
| GB | 2437557 | 10/2007 |
| JP | 2002149969 | 5/2002 |
| JP | 2003141471 | 5/2003 |
| JP | 2004021663 | 1/2004 |
| JP | 2004030334 | 1/2004 |
| KR | 20030006464 | 1/2003 |
| KR | 20040034978 | 4/2004 |
| KR | 20060057369 | 5/2006 |
| KR | 20060062684 | 6/2006 |
| KR | 1999017304 | 2/2007 |
| TW | I 264918 B | 10/2006 |
| WO | WO 1998/01820 | 1/1998 |
| WO | WO 1998/32076 | 7/1998 |
| WO | WO 2000/00923 | 1/2000 |
| WO | WO 2001/14974 | 3/2001 |
| WO | WO 2001/65443 | 9/2001 |
| WO | WO 2002/41236 | 5/2002 |
| WO | WO 2003/077076 | 9/2003 |
| WO | WO 2009/130538 | 10/2009 |

OTHER PUBLICATIONS

Apple, "iPhone 5S: About Touch ID Security," Last Modified Mar. 28, 2014.

Apple, "iPhone 5S: Using Touch ID," Last modified May 6, 2014.

Apple, "iTunes: How to set up an Apple ID within iTunes,".

Apple ID Summary.

Baatz, "Will Your Business Model Float"?, WebMaster Magazine, Oct. 1996 Issue.

"Banc One to Pilot Check-Cashing Units", Bank Systems Technology, p. 18, Jan. 1998.

"Check Fraud Stakes Rise", American Bankers Association, ABA Banking Journal, pp. 42-48 and 63, Aug. 1997; 89, 8; ProQuest.

Chandler, Ian, "Cardholder Verification—Realities at Point-of-Sale", Information Security Technical Report, vol. 3, No. 1, pp. 81-85, 1998.

Chorafas, Dimitris et al., "Applying AI in DP Operations," Chapter 13 of Expert Systems in Banking, New York University Press,p. 284-307, 1990.

Chorafas, Dimitris N., Steinmann, Heinrich, "Expert Systems in Banking: a guide for senior managers", ISBN 0-8147-1449-8, Chapter 13, pp. 284-307.

Dimauro, G., et al., "A System for Bankchecks Processing", Proceedings of the Second International Conference on Document Analysis and Recognition, pp. 454-459, Oct. 20-22, 1993.

Dinan, R.F., et al., "ImagePlus High Performance Transaction System", pp. 421-434, IBM Systems Journal, vol. 29, No. 3, 1990.

EScreen 123 Brochure, downloaded from the web at http://www.escreen.com/products/products.htm on Mar. 13, 2003.

"eScreen News," dated May 14, 2001, downloaded from the web at http://www.escreen.com/news/news05.htm on Jun. 6, 2002.

Farrell, James, "Smartcards Become an International Technology", IEEE Computer Society, pp. 134-140, Dec. 4-7, 1996.

"Finger Scans for Park Passes," obtained from http://allears.net, Date unavailable.

Gil, Paul, "PayPal 101: How PayPal Works, 2014," obtained from http://nelforbeginners.about.com/od/ebay101/ss/ paypal101_2.htm, Nov. 2014.

Grabianowski, E. and Crawford, S., "How PayPal Works," obtained from http://money.howstuffworks.com/ paypal.htm, Dec. 13, 2005.

Harmel, Karen "Walt Disney World: The Government's Tomorrowland?," News 21, a Journalism Initiative of the Carnegie and Knight Foundations, Sep. 1, 2006.

Hicks, John H., "New system to prevent fraud—and turn checks into single-use debit cards?" Journal of Retail Banking Services, vol. 18, No. 3, Sep. 1, 1996.

"How PayPal Works," obtained from http://faculty.ist.psu.edu/bagby/432Fall07/T7/howWorks.html, 2007.

"How Payment Systems Changes Affect Cash Management", Corporate EFT Report, Phillips Business Information, Inc., CEFT vol. 12, No. 26, Dec. 30, 1992, in 4 pages.

Hui, Siu-Cheung et al., "The Design of an Intelligent Signature Processing System for Banking Environment", Proceedings of the Region 10 Annual International Conference (TENCON),US,New York, IEEE, vol. CONF. 9, Aug. 22, 1994 (Aug. 22, 1994), pp. 976-980.

"iOS 7 offers big improvements for big business,".

Jonatansson, "Iceland's health sector database: A significant head start in the search for biological grail or an irreversible error?" American Journal of Law and Medicine 2000.

Koerich, Alsseandro, et al., "Automatic Extraction of Filled Information from Bankchecks", International Conference on Systems, Man, and Cybernetics, Computational Cybernetics and Simulation, pp. 2151-2156, vol. 3, Oct. 12-15, 1997.

Lunt, Penny, "Electronic check presentment on the move", pp. 53-56, ABA Banking Journal; 87,8, Aug. 1995.

Macdonald, Ayang, "Fingerprint Cards partners to roll out biometric payment cards in Japan" Website URL: https://www.biometricupdate.com/202107/fingerprint-cards-partners-to-roll-out-biometric-payment-cards-in-japan, Accessed on Jul. 14, 2021, in 5 pages.

Meckler, Jack M., "Chapter Four: Risks in Check Transactions," from the Corporate Guide to Payments System Risk, Assessing and Controlling Payments Risk, Treasury Management Association, Probus Publishing, Chicago, IL, Cambridge, England, pp. 51-72, 1995.

Murphy, Patricia A., "Electronic check clearing alternatives take shape", ABA Banking Journal, pp. 62-66, May 1993; 85, 5; ProQuest.

O'Mahony, Donal et al., "Characteristics of Current Payment Systems", Chapter 2 of Electronic Payment Systems, pp. 5-17, Artech House Inc., 1997.

"PayPal Name-Value Pair API Basics," obtained from https://developer.paypal.com/docs/classic/api/NVPAPIOverview/, Date Unavailable.

"PayPal and Samsung Allow Consumers to Shop and Pay with Fingerprint Authentication on New Samsung Galaxy S5 ," obtained from http://www.businesswire.com/news/home/20140224006788/en/PayPal-Samsung-Consumers-Shop-Pay-Fingerprint-Authentication#.VRmLRk85Dcs, Mobile World Congress 2014, Feb. 25, 2014.

"PayPal Security Key FAQ," obtained from hllps://www.paypal.com/cgibin/webscr?cmd=xpl/Marketing_CommandDriven/securitycenter/PayPalSecurityKeyFAQ-outside, Date Unavailable.

"PayPal: Account Setup," obtained from hllps://www.paypal.com/webapps/mpp/account-setup, Date Unavailable.

"Paying with PayPal: The fast, easy way to pay without revealing your credit card number," Date Unavailable.

Phillips Business Information, Inc., "How Payment System Changes Affect Cash Management", pp. 1-4, Dec. 30, 1992.

Raghupathi, et al., "Strategic uses of information technology in health care: A state-of-the-art survey", Topics in Health Information Management, Frederick; Aug. 1999.

Ranganathan, A. "Pioneering Fingerprint Authentication for Payments," obtained from https://www.paypal- engineering.com/tags/security, Apr. 11, 2014.

Screenshots obtained from http://iclarified.com.

Sherman, Stephen A. et al., "Secure Network Access Using Multiple Applications of AT&T's Smart Card", AT&T Technical Journal, pp. 61-72, Sep./Oct. 1994.

Sinha, Robin, "PayPal releases payment app with Samsung Galaxy S5 fingerprint-reader support," obtained from http://gadgets.ndtv.com/apps/news/paypal-releases-payment-app-with-samsung-galaxy-s5-fingerprint-reader- support-50832, Apr. 14, 2014.

(56) References Cited

OTHER PUBLICATIONS

Siwicki B., "PayPal enables fast mobile checkout via fingerprint recognition," obtained from https://www.internetretailer.com/2014/05/05/paypal-enables-fast-mobile-checkout-fingerprint-recognition, May 5, 2014.

Thomas, Mike "Finger Scanners at Disney: Just what are they scanning?", Orlando Sentinel, May 22, 2007.

"Use your Fingerprint and PayPal to Shop:Frequently asked questions," obtained from hllps://www.paypal-pages.com/samsunggalaxys5/us/index-faq.html, Date Unavailable.

Weber, "Web sites of tomorrow: How the Internet will transform healthcare", Health Forum Journal; May/Jun. 1999.

"White Paper on IOS Security," Feb. 2014, pp. 3-10.

International Search Report & Written Opinion in PCT/US2011/58460 dated Match 16, 2012.

Office Action received in Canadian App No. 2562964 dated Aug. 22, 2011.

Office Action received in Chinese App No. 200580011962.6 dated Sep. 1, 2010.

Office Action received in European App No. 05732679.5 dated Jul. 10, 2009.

Office Action received in Japanese App No. 2007-506328 dated Sep. 7, 2011.

Office Action received in Japanese App No. 2007-506328 dated Jan. 17, 2011.

Office Action received in Taiwan App No. 94110477 dated Jun. 24, 2011.

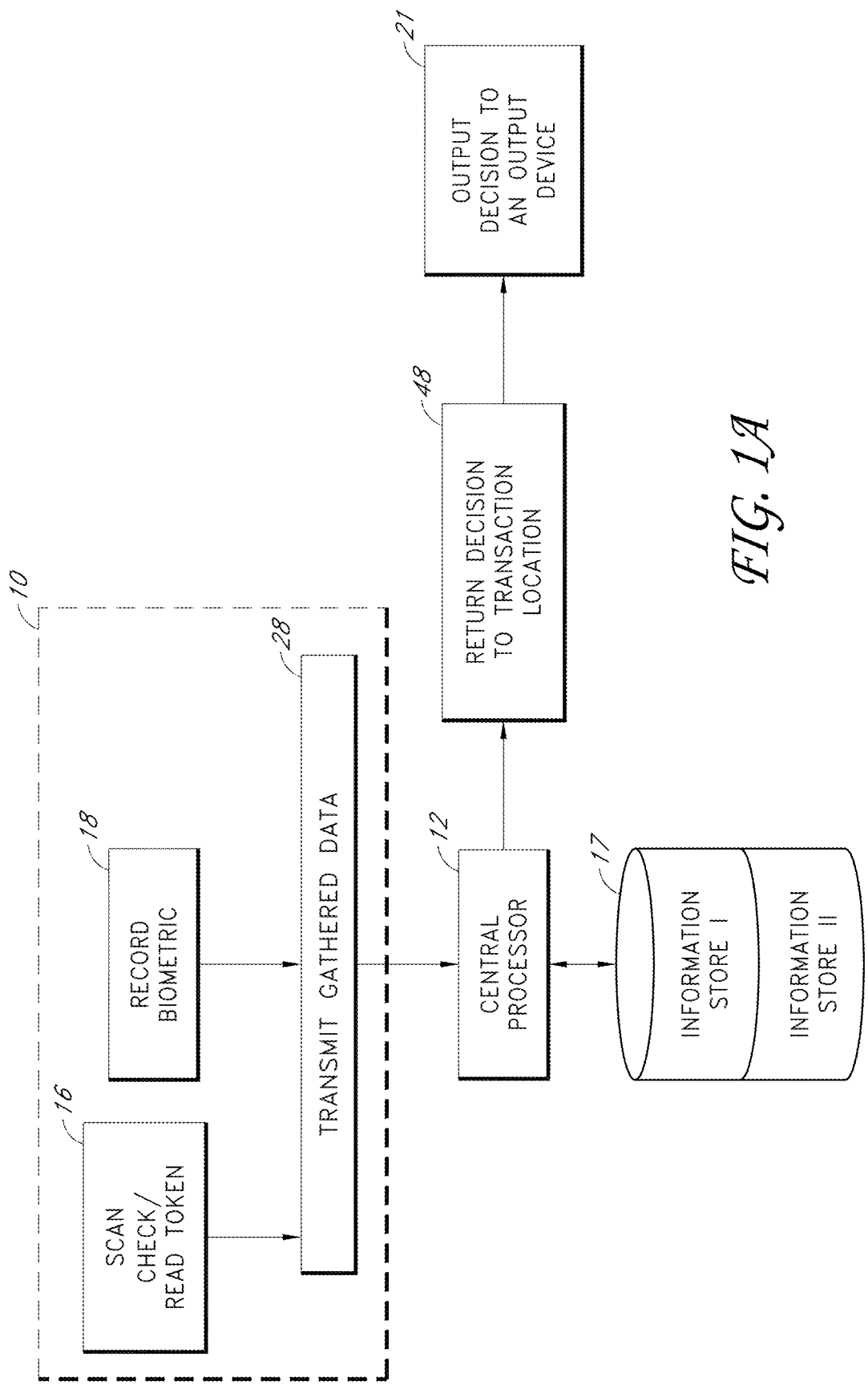

ELECTRONIC TRANSACTION VERIFICATION SYSTEM WITH BIOMETRIC AUTHENTICATION

CROSS-REFERENCE TO RELATED APPLICATIONS

This application is a continuation of U.S. application Ser. No. 17/491,231, filed Sep. 30, 2021, which is a continuation of U.S. application Ser. No. 16/882,079, filed May 22, 2020, now U.S. Pat. No. 11,138,594, entitled ELECTRONIC TRANSACTION VERIFICATION SYSTEM WITH BIOMETRIC AUTHENTICATION, which is a continuation of U.S. application Ser. No. 16/409,609, filed May 10, 2019, now U.S. Pat. No. 10,664,834, entitled ELECTRONIC TRANSACTION VERIFICATION SYSTEM WITH BIOMETRIC AUTHENTICATION, which is a continuation of U.S. application Ser. No. 15/833,406, filed Dec. 6, 2017, now U.S. Pat. No. 10,304,054, entitled ELECTRONIC TRANSACTION VERIFICATION SYSTEM WITH BIOMETRIC AUTHENTICATION, which is a continuation of U.S. application Ser. No. 15/377,412, filed Dec. 13, 2016, now U.S. Pat. No. 9,846,875, entitled ELECTRONIC TRANSACTION VERIFICATION SYSTEM WITH BIOMETRIC AUTHENTICATION, which is a continuation of U.S. application Ser. No. 14/611,571, filed Feb. 2, 2015, which is a continuation of U.S. application Ser. No. 13/934,864, filed on Jul. 3, 2013, now U.S. Pat. No. 9,141,951, entitled ELECTRONIC TRANSACTION VERIFICATION SYSTEM WITH BIOMETRIC AUTHENTICATION, which is a continuation of U.S. application Ser. No. 12/497,512, filed on Jul. 2, 2009, now U.S. Pat. No. 8,485,442, entitled ELECTRONIC TRANSACTION VERIFICATION SYSTEM WITH BIOMETRIC AUTHENTICATION. Each of the above-identified applications is incorporated by reference herein in its entirety.

BACKGROUND OF THE INVENTION

Field of the Invention

The present invention generally relates to credit and identity verification systems. More particularly, the present invention relates to credit approval and fraud protection at the point-of-sale for a transaction wherein biometric information is used to verify the identity of a person presenting a token for payment as an authorized user for the associated account and that the account is in order for the transaction. Transaction tokens can include a negotiable instrument, a credit card, a smart card, a loyalty card and a debit card. Information on the authorized accounts can be stored in either a token-based or tokenless electronic transaction system.

Description of the Related Art

There are devices known in the art that gather biometric data from persons for storage or for comparison with stored biometric data for purposes of identity verification. An example of storing biometric data for identity verification is U.S. Pat. No. 4,213,038 to Silverman, et al., for an access security system. Silverman, et al., discloses storing a fingerprint on a card, in either an actual print or "micropattern," and the card is read by a control means. The fingerprint recordation is ancillary to the preferred function of the card which is identification based upon solely the microperforation of the card, which is not directly related to the fingerprint.

Check funds verification systems are also known in the art that allow merchants and others to verify that customers have funds available in a specific checking account. U.S. Pat. No. 5,484,988 to Hills, et al., discloses a check-writing point-of-sale system that provides for remote verification of funds availability. Hills, et al., is particularly directed to the purchase of goods through an electronic funds transfer.

U.S. Pat. No. 4,253,086 to Szwarcbier discloses a process and apparatus for positive identification of customers that is particularly disclosed as using a fingerprint on a credit card and comparing the fingerprint of the customer to that on the card, and selectively, with a master print on file. Szwarcbier also discloses a printed fingerprint card.

There are "smart cards" known in the art which include fingerprint identification means, such as U.S. Pat. No. 4,995,086 to Lilley, et al., U.S. Pat. No. 4,582,985 to Löfberg, U.S. Pat. No. 4,993,068 to Piosenka, et al., and U.S. Pat. No. 5,180,901 to Hiramatsu. All of these references disclose smart cards that have, at least, a stored fingerprint in a local memory (such as magnetic tape or integrated circuit) that interacts with a reading means at the point-of-sale to assist in customer identification.

An example of an actual fingerprint sensor is U.S. Pat. No. 5,745,096 to Hsumi, et al., which is for a surface-shaped sensor identification device. The Hsumi, et al. device is focused on the specific element of sensing and recording the fingerprint, as opposed to a complete identity verification system.

There are various types of biometric measurements in common use today. The types of biometric measurements include fingerprint verification, hand geometry, voice recognition, retinal scanning, iris scanning, signature verification, and facial recognition. Each biometric device and system has its own operating methodology. The process for any given individual usually begins with an enrollment process. The system captures one or more samples of the biometric. The samples are stored in a "biometric template" (also referred to herein as a biometric database), and are used for future comparison during authentication. Once enrollment and storage are complete, users authenticate themselves by matching the template against current input ("live data"). Comparison of the live data and the template results in a simple binary yes/no match.

Fingerprint verification is a well-known type of biometric measurement. If properly implemented, fingerprints provide high accuracy and at relatively low cost. Hand geometry measures physical characteristics of the individual's hand and fingers and is widely used in physical access control systems. Voice recognition remains difficult to implement. Despite recent advances in voice recognition technology, background noise, microphone quality, the common cold, and anxiety can alter the human voice enough to make voice recognition difficult, if not impossible. Voice recognition technologies include telephone authentication. Extraction and pattern matching algorithms embedded on computer chips are used to analyze voices. Retinal scanning is well established and highly accurate, however, it requires that the individual look directly into the retinal reader. Retinal scans shoot a low-intensity beam of light into the eye and record the pattern of veins in the eye. Iris scanning overcomes most of the problems of retinal scanners and does not require direct contact with the scanner, nor does it require the individual to remove eyeglasses. The technology works by scanning the unique random patterns of the iris. Unlike retinal vein patterns that can change over time, the iris is unique and does not change during a person's lifetime. Facial recognition systems measure characteristics such as the distance between facial features (e.g., pupil to pupil) or the dimensions of the features themselves (such as the width of the mouth). Neural network technology or statistical correlations of the facial geometric shapes are used with this kind of system. Signature verification is a relatively accurate system and is treated separately from the other forms of biometric systems described herein.

With fraudulent check losses alone reaching ten billion dollars annually, the banking industry is striving for ways to reduce these losses. Many proposals have been presented over the last five to ten years. One approach is placing the individual's fingerprint on a sticker and attaching the sticker to the check being presented. Among the more sophisticated approaches is the use of smart cards that have a chip containing biometric information of the account holder. The biometric information stored on the chip can be compared with the biometric information of the person presenting the smart card at the transaction location. However, these alternative methods of reducing fraudulent activity are not meeting the needs of industry. The use of fingerprint stickers are a deterrent for a less sophisticated forger, but the process of identifying the fingerprint on a sticker can take a long time in crime labs due to their backlog and their obvious priority of processing fingerprints obtained from crime scenes in which felonies involving violence occurred. Smart cards with embedded biometric chips are used with credit cards or debit cards, but still do not prevent the more sophisticated identity thief. The more sophisticated identity thief steals account information and then produces his own credit card containing his own biometric information embedded in the chip. When the identity thief presents his biometric information at the transaction location, the verification is being made against an already faulty biometric sample stored on the chip.

Tokenless point-of-sale payment processing systems have also been developed recently. One such system is described in U.S. Pat. No. 6,581,042 to Pare, et al. that uses biometrics obtained at the point-of-sale for verifying the identity of an individual as an authorized user of the tokenless payment system. Tokenless processing systems are intended to speed up the process of check-out at a transaction location by not requiring the person to present a physical token and by verifying the identity of the person presenting payment with the tokenless processing system. A drawback of current tokenless systems is that they only verify tokenless transactions. Tokenless systems do not verify the individual's identity or cross compare with a token-based transaction processing system when a transaction token is presented for payment at the point-of-sale. Therefore, unless the tokenless transaction system can be combined with verification of token transactions presented at the point-of-sale the tokenless transaction system does not prevent and is vulnerable to fraud. For example, a person registers with the tokenless processing system by providing account information and a biometric for identification during the processing of purchases at the point-of-sale by the tokenless processing system. The person registering with the tokenless system believes that all purchases will be authenticated by his biometric. However, this does not prevent a thief from either stealing or fabricating the registered person's physical token (e.g., check, credit card, etc.) and presenting it at a location that uses the tokenless processing system. Unless the physical token presented is checked against the tokenless processing payment system to determine if the account being accessed needs to be authenticated by a biometric, the physical token could be accepted without verifying the identity of the person presenting the token for payment.

SUMMARY

Various embodiments described herein, combine the use of valid biometric samples obtained from authentic identifications (IDs) with biometric samples provided by a person at a transaction location, thereby verifying that the biometric information presented for a transaction is a valid biometric for a particular person. In addition, the ID and the biometric sample can also be checked against known invalid users. Although it is possible for someone to counterfeit what is believed to be the authentic ID, in such cases, the identity thief provides an actual fingerprint that has been taken and placed on the token or on the transaction slip. When the token is returned to the transaction location as forged, counterfeit, stolen, etc., the fingerprint is entered into the database of known invalid users, thus preventing any further identity theft activity by this person on the verification system. Various embodiments add additional safeguards, such as verifying the ID with information from the state. This ensures that an ID has not been altered, and is in fact an authentic state-issued ID (e.g., driver's license). Another such safeguard is verifying the information at the processing center of the token with the original information that a bank or token company obtained at the creation of the bank or token account.

Various embodiments include a verification system for check/negotiable instruments or other form of tokens, which has the ability to scan the information from negotiable instruments such as the magnetic ink character recognition (MICR) line, and gather biometric data such as fingerprints. The system alternately and/or additionally scans driver's licenses or other identification cards, and obtains and transmits a signature of a customer, preferably all occurring at a transaction location (e.g., point-of-sale) for purposes of identity and fund verification. However, the electronic transaction can occur at places other than a point-of-sale. For example, the electronic transaction can occur over the Internet, as part of an Internet-based transaction and include transmission of biometric data or signatures for user verification. Therefore, in general, transaction location refers to the place where the user or customer enters his information, such as account data or biometric data into the electronic transaction verification system. The verification system preferably digitizes various indicia of the check, the preferred indicia being the magnetic ink (MICR line) on the check, tendered by the customer at the transaction location, and transmits the data through a communications medium, to a processing system including a negotiable instrument information database, whereby the inputted data is compared with an existing database of information to determine if the customer at the point-of-sale is in fact authorized to use the account, and if the account is in satisfactory condition for transaction approval. The communications medium can be a broadband connection, a dial-up connection, a direct communications link, a satellite link, or fiber optic cable or any other communication link that allows communications between a transaction location and a central or local processing system and database.

In this exemplary embodiment, the verification system alternatively includes a device and method for recording and/or transmitting a biometric measurement of the customer at the location of the transaction and, in the case of a fingerprint biometric, printing the fingerprint on the negotiable instrument, either in actual or digitally encoded form, such that the fingerprint can be later checked against a biometric database of existing fingerprints at such time as the instrument is processed at a bank, which provides an added means of security in the event that fraudulent activity has been discovered between the time of receiving the token at the transaction location and the time it is presented at the processing center. If the system includes a device for scanning an information card that contains biometric data, such as a proper fingerprint printed on a driver's license, and/or signature, then the fingerprint and signature of the user can alternatively be compared to the recorded data on the card, in addition to or instead of, transmission of the various databases.

In another embodiment of the verification system, a negotiable instrument or other token is swiped and the fingerprint is simultaneously taken and digitized whereby the combined data is transmitted to a central (or local) processing system that includes an account information database and a biometric database, and the transmitted data is compared with identification data already on file, and the central (or local) processing system determines if the identification data of an authorized user on file matches with the transmitted data from the user at the transaction location. Local system, in the present context refers to a system that is in physical proximity to the transaction location (e.g., same store). The system then returns the results of the decision on approval to the transaction location. A device at the transaction location displays the decision data and/or prints out a hard copy indicating whether the negotiable instrument/token was approved or denied.

As is well known in the banking industry, the MICR line on a check includes the bank routing number, account number, check number, check amount, and other information, that can be printed near the bottom of the check in magnetic ink in accordance with generally applicable industry standards. In operation, the central (or local) processing system receives data from the transaction location and then determines if the "ABA" magnetic number on the MICR line of the check is a valid number, if the fingerprint data is that of an account owner authorized to use that account, and/or if the signature is that of the authorized account owner, whereby any negative response to these decisions preferably causes return of the data indicative of the negative response to the transaction location. Upon affirmative indications in the decisions, the central (or local) system retrieves the frequency of the account accesses to determine if the current requested access is in excess of a pre-determined limit of an allowable number of accesses. If the current access is in excess of the pre-determined allowable limit, then the data is returned to the transaction location indicating the unacceptable request to exceed the limit, and thus, disapproval of the transaction. If the current access is not in excess of the allowable determined limit, then the verification of the check is approved and such verification is used to update the frequency of account access database, and the approval is returned to the transaction location. Various account conditions can be used, alternatively, to verify the condition of an account. Such conditions can include "outstanding checks," "returned checks," and "account closed" among others. For example, if there are outstanding checks on the system for a user's account, then in various embodiments, an indication can be returned to the transaction location that the user's account is not in condition to satisfy the negotiable instrument. Likewise, if the token is a credit card, debit card, loyalty card, smart card or similar-type token, the condition of an account can include "exceeding credit limit," unpaid balance," "insufficient funds," etc.

In a further exemplary embodiment, the transaction database and/or the biometric database within a tokenless payment system can be used to verify or authenticate the person presenting a token at the transaction location. The token being presented at the transaction location is swiped obtaining the necessary account information and sent to a processor for comparison with account information stored in the transaction information database within the tokenless processing system. If a match occurs with account information stored in the transaction database of the tokenless system, the token system then requires the token to be authenticated by a biometric. The biometric information is then sent either separately or in parallel with the transaction information to the tokenless system for approval.

The verification system preferably includes the capability to provide reports on user/customer activity to a merchant or business upon request. The merchant directs an inquiry to the central (or local) system which is in communication with a series of databases and which preferably includes databases indicative of: a number of transactions for a specific account; the location of the transactions for such account; and a user/customer list and relevant data associated with the user/customer. Depending upon the inquiry generated from the merchant, the main (or local) system retrieves the requested information to generate a report on a specific customer, and then returns the report to the merchant.

Alternatively, the verification system can be used in conjunction with a bank proofing machine during batch processing of checks. When the proofing machine scans the magnetic number from the check, the identification data imprinted on a check at the transaction location is compared with account owner identification data as recorded and maintained by the bank to determine if the correct account owner submitted the check. The verification system can also be used in conjunction with an Electronic Check Exchange (ECE) system in which the check information is exchanged electronically, in lieu of or in addition to the exchange of paper checks. For forward presentment, an ECE system is usually referred to as an Electronic Check Presentment (ECP) system. The verification system can be used in conjunction with Automatic Clearinghouse (ACH) processing systems. Furthermore, the verification system can be used in conjunction with a token processing system such as a credit card or debit card processing center to verify the information read from the magnetic strip on the token with information recorded and maintained by the credit or debit card processing center.

In various embodiments, a transaction verification system or a negotiable instrument system for use at a location where a transaction instrument (e.g. a check, a negotiable instrument, a cashiers check, money order, token, credit card, debit card, check card, decoupled debit card, a physical object or device that includes a user's financial account information, a physical object or device that includes information representative of a user's financial account information, a food stamp, etc.) is disclosed. The system comprises a transaction instrument scanner (sometimes referred to as a negotiable instrument reader) that is configured to read encoded information on the transaction instrument when it is presented by a receiving entity. The system further comprises a biometric scanner (sometimes referred to as a biometric reader) configured to generate a biometric data from an individual representing the receiving entity and an electronic communication system configured to transmit information to a central processing system and receive information from the central processing system. In various embodiments, the central processing system can be in communication with the transaction instrument scanner and the biometric scanner. In several embodiments, the central processing system can comprise one or more information stores configured such that the one or more information stores include information associated with a plurality of transaction instruments previously provided by an issuing entity issuing the plurality of transaction instruments. In various embodiments, the one or more information stores can further include biometric information from a plurality of receiving entities, each of the plurality of receiving entities having received at least one of the plurality of transaction instruments from the issuing entity. In various embodiments, the transaction instrument information and the biometric data are compared to the one or more information stores, and a result of the comparison is analyzed to determine if the transaction instrument should be accepted.

In various embodiments, a transaction verification system or a negotiable instrument system for use at a location where a transaction instrument (e.g., a check, a negotiable instrument, a cashiers check, money order, token, credit card, debit card, check card, decoupled debit card, a physical object or device that includes a user's financial account information, a physical object or device that includes information representative of a user's financial account information, a food stamp, etc.) is disclosed. The system includes a transaction instrument scanner (sometimes referred to as a negotiable instrument reader) that is configured to read encoded negotiable instrument information from a negotiable instrument issued by an issuing entity. The system further includes a biometric scanner (also referred to as a biometric data reader) configured to generate biometric data from an individual representing the receiving entity and an electronic communication system configured to transmit at least negotiable instrument information and the biometric data to a central processing system and receive information from the central processing system. In various embodiments, the central processing system can be in communication with the transaction instrument scanner and the biometric scanner. In several embodiments, the central processing system can be configured to access one or more information stores, the one or more information stores including information associated with a configured such that the one or more information stores include information associated with a plurality of transaction instruments (or negotiable instruments). The negotiable instrument information stored in the one or more information stores is previously provided by the issuing entity. In various embodiments, the one or more information stores can further include biometric information associated with a plurality of individuals, each of said plurality of individuals associated with the receiving entity. The electronic communication system is further configured to provide an indication as to whether the negotiable instrument should be accepted, said indication based on a comparison between the negotiable instrument information, the biometric data and data from the one or more information stores. In various embodiments, the comparison can be performed by the negotiable instrument system, or the central processing system, or by an electronic system at a remote location.

Various embodiments described herein disclose a method of processing a transaction (or negotiable) instrument issued by an issuing entity tendered by a receiving entity. The method includes receiving, encoded information associated with the transaction (or negotiable) instrument tendered by the receiving entity. The encoded information can be obtained by a transaction instrument scanning device or a negotiable instrument reading device. The method further includes obtaining biometric information, related to an individual associated with the receiving entity tendering the transaction (or negotiable) instrument. In various embodiments, the biometric information can be obtained by a biometric scanning device or a biometric information reader. The method further includes accessing information from one or more information stores accessible via a central processing system and comparing the information obtained from the transaction instrument and the biometric information with the accessed information. In various embodiments, the one or more information stores can include information associated with a plurality of transaction (or negotiable) instruments, said information previously provided by an issuing entity, and biometric information related to a plurality of individuals. Each of the plurality of individuals can be associated with at least one receiving entity. In various embodiments, each receiving entity may have received at least one transaction (or negotiable) instrument from the issuing entity. A determination of whether the transaction instrument should be accepted or rejected is made based on a result of the comparison. The result of the comparison or the decision regarding accepting or rejecting the transaction instrument can be communicated to an output device. In various embodiments, the output device may include but not be limited to a display device or a printing device. In various embodiments, the negotiable instrument information and the biometric information can be received in substantially real time.

Various embodiments described herein disclose a method of processing a transaction at a location where a transaction token is presented by an individual. The method includes obtaining encoded information from a transaction token at the time the transaction token is tendered by an individual. The encoded information can be obtained using a device configured to read the token. The method further includes obtaining biometric information from the individual tendering the transaction token. The biometric information can be obtained using a biometric reader. The method further includes accessing one or more information stores to determine if any biometric information is associated with the transaction token and if no biometric information is associated with the token, then the biometric information obtained from the individual is associated with the transaction token in the one or more information stores. The biometric information obtained for a few initial uses can serve as a template by which subsequent transactions can be verified. For example, in various embodiments, the biometric information obtained at a subsequent time the transaction token is presented by the individual can be compared to the biometric information previously associated with the transaction token to verify that the individual is an authorized user of the token. If it is determined, that the transaction token is invalid because it is forged or counterfeit and/or the obtained biometric information does not match the previously stored biometric information, then the biometric information associated with that token can be added to an information store that includes a list of invalid users.

Various embodiments described herein disclose a method of processing a transaction token. The method includes enrolling one or more users in a verification system, the enrolling process including receiving user information related to one or more users, the user information including at least a biometric datum; receiving transaction token information associated with one or more transaction tokens issued to the one or more users by an issuing entity and storing said user information and transaction token information in one or more data stores accessible by a central processing system. The method further comprises providing said stored user and transaction token information to a transaction token processor. The method further includes processing a transaction token including receiving, in substantially real time, encoded information from the transaction token tendered by a user, the encoded information obtained by a transaction token reading device and also receiving, in substantially real time, biometric data from the user tendering the transaction token, the biometric data obtained by a biometric scanning device. The method further includes accessing the one or more data stores and comparing the encoded information obtained from the transaction token and the biometric data obtained from the user with information stored in the one or more data stores. The method further includes determining if the transaction token should be accepted based on a result of the comparison; and communicating to a system point of access, in substantially real time, the result of the determination. In various embodiments, enrolling the one or more users is performed prior to processing the transaction token. In various embodiments, the transaction token information is provided by the issuing entity every time a transaction token is issued, for example, every week, every two weeks or every month. In various embodiments, the biometric information includes a finger print, a retinal scan or a face scan. In various embodiments, the transaction token includes a physical object that includes information representative of the individual's or issuing entity's account information. In various embodiments, the transaction token includes a negotiable instrument, a credit card, a debit card, a loyalty card, a decoupled debit card, a device enabled with radio frequency identification, a smart card, a flash drive, a usb thumb drive, a usb pen drive, a usb pin drive, or food stamp.

Various embodiments described herein disclose a method of processing a transaction token. The method includes enrolling one or more users in a verification system, the enrolling process including receiving user information related to one or more users, the user information including at least a biometric datum; receiving transaction token information associated with one or more transaction tokens issued to the one or more users by an issuing entity and storing said user information and transaction token information in one or more data stores accessible by a central processing system. The method further comprises providing said stored user and transaction token information to a transaction token processor. The transaction token processor can be configured to receiving encoded information related to the transaction token tendered by a user, the encoded information obtained by a transaction token reading device and also receiving, biometric data associated with the user tendering the transaction token, the biometric data obtained by a biometric scanning device. The method further includes accessing the one or more data stores and comparing the encoded information obtained from the transaction token and the biometric data obtained from the user with information stored in the one or more data stores. The method further includes determining if the transaction token should be accepted based on a result of the comparison; and communicating to a system point of access the result of the determination. In various embodiments, receiving the encoded transaction token information, receiving the biometric information and communicating the result of the determination can be performed in substantially real time. In various embodiments, enrolling the one or more users is performed prior to processing the transaction token. In various embodiments, the transaction token information is provided by the issuing entity every time a transaction token is issued, for example, every week, every two weeks or every month. In various embodiments, the biometric information includes a finger print, a retinal scan or a face scan. In various embodiments, the transaction token includes a physical object that includes information representative of the individual's or issuing entity's account information. In various embodiments, the transaction token includes a negotiable instrument, a credit card, a debit card, a loyalty card, a decoupled debit card, a device enabled with radio frequency identification, a smart card, a flash drive, a usb thumb drive, a usb pen drive, a usb pin drive, or food stamp.

Accordingly, various embodiments described herein have a practical application in that they provide an electronic transaction verification system to a merchant for use at a transaction location, which determines if the user/customer is authorized to use a specific account, and if the account is in satisfactory condition to remit funds for the negotiable instrument drawn against it.

Various embodiments of the electronic transaction verification system described herein further have industrial applicability in that they provide a computer system which correlates biometric data that is precise with not easily forgeable measurements of a customer, such as fingerprints and/or data from identification cards, and that can be digitally encoded and processed along with the information relative to a negotiable instrument such that the risk of the merchant accepting a bad instrument is greatly reduced. Thus, the various embodiments can be quite economically beneficial to a merchant utilizing the system.

More generally, the embodiments described herein are applicable to electronic transaction verification of a person initiating a transaction with a token at a transaction location. In various embodiments, without limitation, a transaction token can include a negotiable instrument, a check payable on demand, a substitute check, a traveler's check, a debit card, a credit card, a smart card, a promissory note, food stamps, or any other token presented at the point-of-sale for payment. The point-of-sale can be a physical or virtual (i.e., web site) store location. The token is presented at a transaction location to a vendor or merchant. The transaction is initiated by the user presenting a token at the transaction location along with a biometric measurement being taken to verify the identity of the individual against information stored in a database. Information read electronically from the token is used to determine the condition of a user account.

A substitute check, as used herein, has the meaning given to it in the "Check Clearing for the 21$^{st}$ Century Act," Public Law 108-100, Oct. 28, 2003. A substitute check is a legal equivalent of the original check that has been truncated. It contains an image of the front and back of the original check and bears a MICR line containing all information appearing on the MICR line of the original check.

BRIEF DESCRIPTION OF THE DRAWINGS

The disclosure is better understood by reading the following detailed description of the various embodiments in conjunction with the accompanying drawings.

FIG. 1A is a block diagram of an exemplary embodiment of the electronic transaction verification system illustrating a verification unit in communication with a central processing system, a plurality of information stores and an output device.

DETAILED DESCRIPTION OF THE VARIOUS EMBODIMENTS

The following detailed description is directed to certain specific embodiments. Those skilled in the relevant art will recognize that many changes can be made to the embodiments described, while still obtaining the beneficial results described herein. It will also be apparent that some of the desired benefits of the various embodiments described herein can be obtained by selecting some of the features of the embodiments described herein without utilizing other features. Accordingly, those who work in the art will recognize that many modifications and adaptations to the present invention are possible and may even be desirable in certain circumstances and are a part of the present invention. Thus, the following description is provided as illustrative of the principles of the various embodiments of the electronic transaction verification system and not in limitation thereof, since the scope of the present disclosure is defined by the claims.

Figure 1:
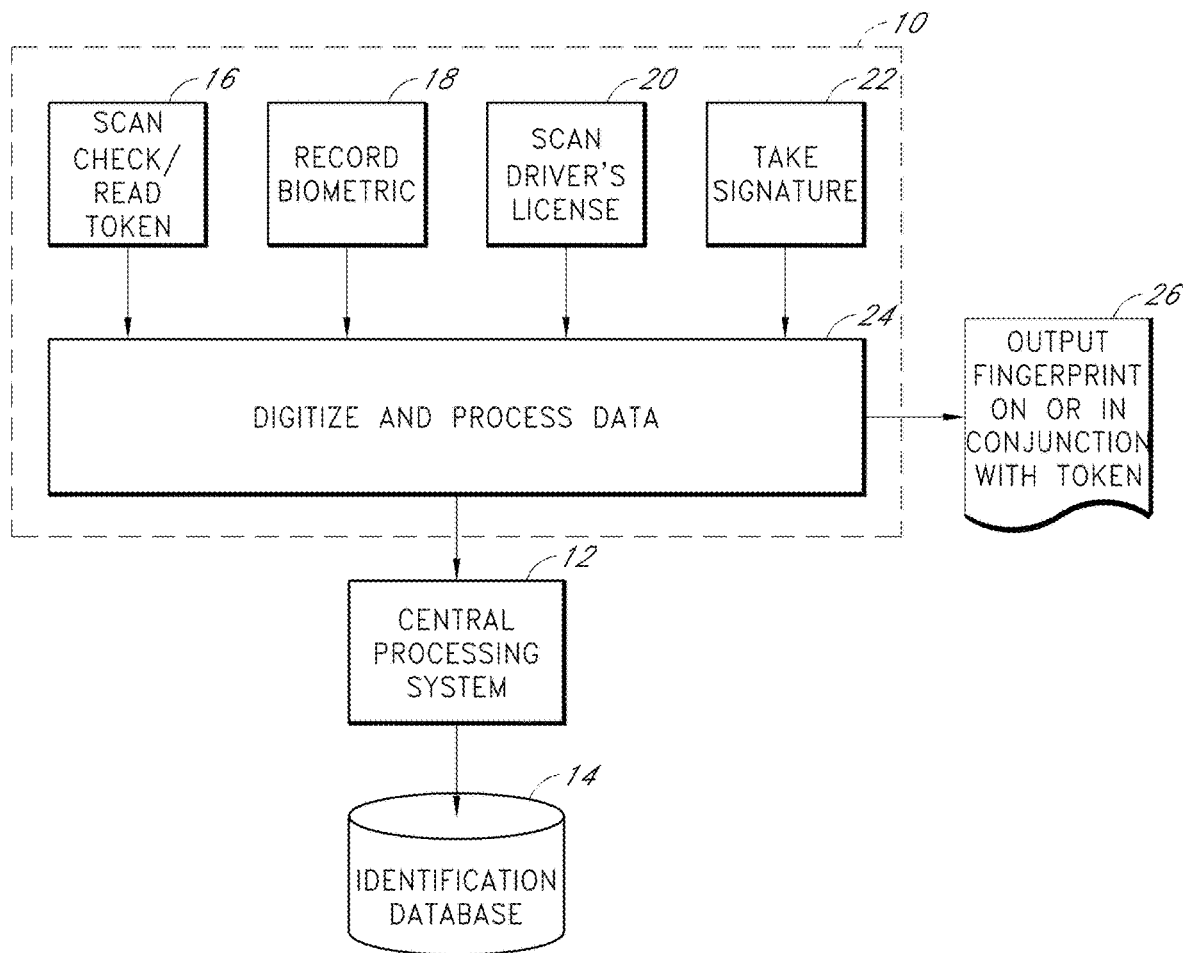
FIG. 1 is a block diagram of an exemplary embodiment of the electronic transaction verification system illustrating a verification unit in communication with a central processing system and identification database.

Referring now in greater detail to the drawings, in which like numerals represent like components throughout the several views, FIG. 1 illustrates a block diagram of an exemplary embodiment of the verification system illustrating an electronic transaction verification unit 10 in communication with a central processing system 12 that includes an identification database 14. Embodiments of the various electronic transaction verification systems usable with systems and methods of the present disclosure are described in the co-pending U.S. patent application Ser. No. 12/050,772 titled "Electronic Transaction Verification System" filed on Mar. 18, 2008, published as U.S. Publication No. 2008/0156866 on Jul. 3, 2008, which is incorporated by reference herein in its entirety. The identification database 14 can include a number of databases used in the identification process such as a biometric database of known customer data, as well as a separate database of known invalid users. The database of known invalid users can be established by correlating a biometric presented at a transaction location that is used with a fraudulently obtained transaction token, and storing the biometric as invalid. Central processing system 12 can be a main system remote from the transaction location. While a check is disclosed as one type of token to be processed in an exemplary embodiment of the present inventive system, other tokens can be processed in the same manner as disclosed herein. Negotiable instrument, as the term is used herein is defined in Article 3 § 104 of the Uniform Commercial Code. An instrument is negotiable if it is: (1) a written instrument signed by the endorser or maker; (2) an unconditional promise to pay a certain amount of money, either on demand or at a future date; and (3) payable to the holder or bearer. Examples of negotiable instruments are checks, bills of exchange, and promissory notes. A check as used herein means a draft, payable on demand and drawn on a bank, or a cashier or teller's check. This is the customary definition of a check. The exemplary embodiment of the electronic transaction verification unit 10 is comprised of, at least, a check scanner or token reader 16 and a biometric data-gathering device 18, such as a fingerprint recording device.

Many check scanning devices are known in the art that scan the magnetic ink on the bottom of checks and such devices range in use from point-of-sale devices to scanners used at banks, where the more advanced devices are referred to as bank "proofing" machines. However, such device alternately and/or additionally includes the capability of video digitization of the check or gathering of other characteristics of the check that are useful for comparison.

The biometric recording device 18 preferably digitizes the fingerprint of a customer at the point-of-sale for transmission to a remote biometric database. Many devices for digitization and transmission of fingerprints are well known in the art, such as the devices of digital biometrics. Other biometric devices such as retinal scanners and voiceprints are alternately and/or additionally used with, or in lieu of, the exemplary fingerprint scanner. Such biometric devices are commercially available and adaptable for use with the various embodiments of the electronic transaction verification system described herein. The electronic transaction verification unit 10 also preferably includes a card reader/scanner, such as a driver's license scanner 20 which scans information from a driver's license, which is especially useful in states that put information, such as fingerprints, in a computer-readable medium such as a magnetic strip (e.g., a California license) or a bar code (e.g., a Georgia license) on the driver's license. When the license contains this information, the electronic transaction verification unit 10 can perform an initial comparison between the biometric recorder device 18 and the device's license scanner 20 for determination of the user's/customer's identity, in addition to or instead of, transmitting biometric data to the biometric database of the central processing system 12. The information gathered from the license scanner 20 can also be verified with information licensed from a state division of motor vehicles in order to authenticate a driver's license. Finally, the electronic transaction verification unit 10 preferably includes a signature-taking device 22 that allows a customer to write his or her signature on the device that then encodes the signature into digital format for transmission. Such transmissions can occur with or separately from the transmission of the check identification and biometric data. There are many devices known in the art that allow a signature to be digitized for storage and comparison, and any of such devices will work satisfactorily in the present inventive system.

The electronic transaction verification unit 10 is preferably a computer platform which has the capability to receive, digitize and process the incoming data from the devices, shown by block 24, for transmission to a central processing system 12. The central processing system 12 can be remotely located from the electronic transaction stations or can be at the same location as the electronic transaction station, e.g., an in-store central processor and database connected to electronic transaction stations by a local area network. The other devices can be integrated with the computer platform of the electronic transaction verification unit 10, however, the devices can also be independent from the computer platform as long as they are in connection with the electronic transaction verification unit 10 sufficient to transmit and have received by the unit 10 the relevant data from the devices. The central processing system 12 is in connection with, at least, an identification database 14, which at a minimum contains the relevant specific identification data related to various checking and/or credit accounts. The identification database 14 can be a hard drive on the central processing system 12, computer platform, or other type of memory device located either locally or remotely, but in connection with, the central processing system 12. Thus, in a basic form, the embodiments described herein solely generate and record identification data of the customer relevant to a single sale and acceptance of a token at a transaction location through recordation of the specific token identification and biometric data of the customer at the transaction location, which is then transmitted by the various devices of the electronic transaction verification unit 10 for recordation. When the simple recordation of the event is effected, it is preferable that the electronic transaction verification unit 10 output a fingerprint (or other biometric data) for inputting on the specific check, negotiable instrument, or in conjunction with another type of token at the transaction location, shown by output 26, either in actual or digitally encoded form, whereby this identifying characteristic of the person cashing or tendering the check is contained upon the check itself and banks processing the check have the capability to compare that imprinted fingerprint with fingerprints on file for the actual account holders, if necessary. However, the printing of the fingerprint on the check or in conjunction with the token (e.g., credit card receipt) can be alternately and/or additionally used in any embodiment of the present inventive verification system.

Various embodiments of the system described herein can be used to verify, validate and/or process various transaction instruments issued by an issuing entity to a receiving entity. As used herein, a transaction instrument can include but is not limited to personal checks, payroll checks, cashier or teller's check, traveller's check, negotiable instruments, a draft payable on demand and drawn on a bank, money orders, credit cards, debit cards, decoupled debit cards, loyalty cards, check cards, smart cards, flash drives, usb thumb drives, usb pen drives, usb pin drives, memory stick, food stamps, tokens, etc. In various embodiments, the transaction instrument or a transaction token can include a physical object, apparatus or device that holds information related to one or more financial accounts associated with a user. In some embodiments the transaction instrument or transaction token can include a physical device that is enabled with radio frequency identification (RFID) tag that holds information associated with or representative of one or more financial accounts associated with a user. As used herein an issuing entity can be any entity that issues the transaction instrument. Examples of issuing entities include but are not limited to an individual, an employer, a corporation, municipal, state and federal government, etc. As used herein, a receiving entity can be any entity to whom the transaction instrument is issued by the issuing entity. Examples of a receiving entity are individuals, employees, corporations, partnerships, etc. As an example, in some embodiments, the receiving entity is an employee of the issuing entity which is an employer or a company. In this example, the employee can receive a payroll check or a reimbursement check from the employer.

In various embodiments, the receiving entity can exchange the transaction instrument for money, goods and/or commodities at a transaction facilitating entity. As used herein, a transaction facilitating entity is an entity that accepts and processes various transaction instruments described above and exchange these transaction instruments money, goods and/or commodities. Examples of transaction facilitating entities are banks, retailers, super-markets, check cashing companies, payment processing companies, etc.

FIG. 1A is a block diagram of an exemplary embodiment of the verification system illustrating an electronic transaction verification unit 10 in communication with a central processing system 12 and a plurality of information stores 17 that can be used process various transaction instruments at a transaction location. In various embodiments, the transaction location can include the transaction facilitating entity's premises. As described above, in some embodiments, a part of the verification system illustrated in FIG. 1A can be located at the transaction location and another part can be located at a location remote to the transaction location. For example in some embodiments, the electronic verification unit 10 can be provided at the transaction location, while the central processor 12 and the plurality of information stores 17 can be provided at a location remote from the transaction location and accessed for example, via a network such as the Internet. However, in other embodiments, the central processor 12 and the plurality of information stores 17 can be provided at the transaction location. Although, a plurality of information stores 17 is illustrated in FIG. 1A, a single information store can also be used in some embodiments. As described herein, the plurality of information stores 17 can include databases, relational databases, lists or other types of data stores that can be accessed electronically.

Upon presentation of the transaction instrument, the verification system can scan and/or read the transaction instrument to obtain information encoded therein by a reading device 16 configured to scan and/or read the transaction instrument. In various embodiments, the reading device 16 can be a check scanner or a token reader as described above. In various embodiments, the encoded information can include but is not limited to name of the receiving entity, "ABA" number, account number, card number, serial number or check number, date of issue of the transaction instrument, expiry date of the transaction instrument, the value of the transaction instrument, the amount specified on the transaction instrument, etc.

The verification system can also obtain biometric information from the individual presenting the transaction instrument using the biometric data gathering device 18 described above. In various embodiments, the biometric information can be at least one fingerprint, a retinal scan or some other biometric signature. The encoded information and the biometric information gathered by the verification system can be transmitted to the central processor 12 by an electronic communication system as shown by the logic block 28.

In various embodiments, the electronic communication system can include a wired or a wireless network. In various embodiments, the gathered information may be transmitted to the central processor 12 in substantially real time such that central processor 12 receives the gathered information in less than approximately 1 minute, 2 minutes, 3 minutes or 5 minutes after the transaction instrument is scanned or read. In some embodiments, the gathered information may be transmitted to the central processor 12 over a time period which extends over a few hours or a few days. As described above with reference to FIG. 1, the verification system may also scan information from the driver's license of the individual presenting the transaction instrument using a driver's license scanner 20 and transmit the driver's license information to the central processor 12 in addition to the encoded information from the transaction instrument and the biometric information.

The central processor 12 is configured to access one or more information stores 17 to verify, validate and/or process the received information. For example, in some embodiments, the central processor 12 can access data and/or one or more lists stored in the one or more information stores 17. The plurality of information stores 17 and the data stored therein can be maintained by a transaction validating entity that verifies, validates and/or processes transaction instruments. Examples of transaction validating entities are banks, financial institutions, payment processing companies, check clearing companies, etc. In various embodiments, the transaction facilitating entity and the transaction validating entity may be same.

The data and lists can be previously provided to the transaction validating entity by an individual or a company associated with the issuing entity. In various embodiments, the lists can include information associated with a plurality of transaction instruments issued by the issuing entity and biometric information of one or more individuals associated with or representing one or more receiving entities. In some embodiments, the individual whose biometric information is included in the list can be the receiving entity. In other embodiments, the individual whose biometric information is included in the list can be a person authorized by the receiving entity to act on its behalf. In various embodiments, the issuing entity can obtain the biometric information while registering or enrolling the receiving entity in a transaction verification system such as a payroll program whereas in other embodiments, the biometric information gathered the first few times a transaction instrument is presented can provide a template by which future transactions are verified. A method of enrolling individuals associated with or representing one or more receiving entities in a transaction verification system is illustrated in FIG. 1B and further described below.

If the encoded information obtained by the reading device 16 matches an item in one or more information stores 17 and the biometric information obtained from the biometric data gathering device 18 matches the stored biometric information for the individual associated with the receiving entity to whom the transaction instrument was issued, then the transaction validating entity can make a decision to approve the transaction. However, in some embodiments, if the obtained encoded information does not match any item in the one or more information stores 17 and/or the biometric information does not match the stored biometric information for the individual associated with the receiving entity, then the transaction validating entity can reject the transaction. Alternatively, if the obtained encoded information and/or the biometric information does not match one or more entries in the one or more information stores, then the transaction validating entity can seek approval from the issuing entity prior to making a decision on the transaction.

The decision can be returned to the transaction location as illustrated by the logic block 48. In various embodiments, the decision can be output to an output device as shown in the output block 21. In various embodiments, the output device can include but not be limited to a display device or a printing device or both. Other types of output devices known to persons having ordinary skill in the art can be also used. In various embodiments, the above described method can performed in substantially real time such that a decision on the transaction instrument can be returned to the transaction location and output to the output device in less than approximately 1 minute, 2 minutes, 3 minutes or 5 minutes from the time the transaction instrument is read or scanned. In some embodiments, the decision on the transaction instrument can be returned to the transaction location in a time period which extends over a few hours or a few days from the time the transaction instrument is read or scanned.

Figure 1B:
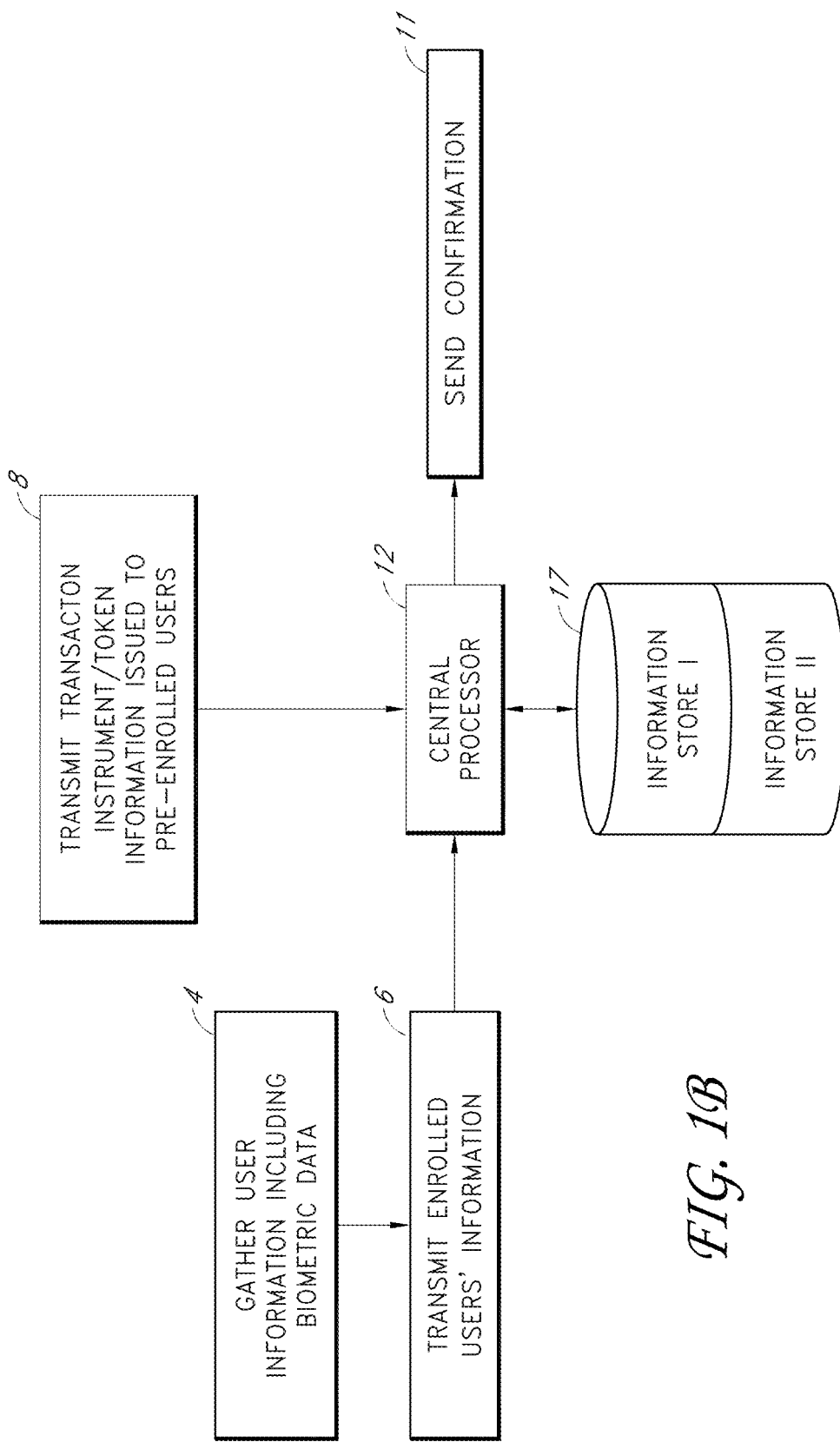
FIG. 1B is a block diagram illustrating a method to enroll users in a transaction verification system.

FIG. 1B illustrates an embodiment of a method to enroll users in a transaction verification system. In various embodiments, the users of the transaction verification system can be individuals associated with or representing one or more receiving entities. In various embodiments, the transaction verification system can have some similarities with various fraud detection and prevention systems such as POSITIVE PAY.

To enroll users in the transaction verification system, an issuing entity or an individual or company associated with the issuing entity gathers user information as shown in block 4. The gathered user information may include information such as name, identification number (e.g., social security number, employee identification number, etc.), date of birth, address, etc. The gathered user information can also include biometric data associated with the user. The biometric data as referred to herein includes a characteristic of the user's body. For example, biometric data can include but not be limited to related to any one or more of a user's fingerprint, eye retina and iris, handprint, voice pattern, facial pattern, etc.

The gathered user information can be transmitted to the central processor 12 as shown in block 6. The central processor 12 can store the gathered user information in one or more information or data stores 17. As discussed above, in various embodiments, the one or more information stores 17 can be maintained by the transaction validating entity.

In various embodiments, when the issuing entity issues a transaction instrument or token to the user, information associated with the transaction instrument or token can be transmitted to the central processor 12 as shown in block 8 of FIG. 1B. The information associated with the transaction instrument or token can include but is not limited to name of the user, transaction amount, date of issue, expiration date, etc. In various embodiments, the information associated with the transaction instrument or token can be encoded in the transaction instrument or token. The transaction instrument or token information can be stored in an information store that is different from the information store that includes the user information. The user information store and the transaction instrument or token information store can have a common field which links the transaction instrument or token issued to an user with the information (e.g., biometric information, etc.) associated with that user. However, in other embodiments, the information associated with the transaction instrument or token can be stored in the same information store that includes user information.

In various embodiments, the central processor 12 may send a confirmation as shown in block 11 of FIG. 1B. In some embodiments, the confirmation is sent to the system that transmits the user information and/or the transaction instrument or token information. The confirmation message can include confirmation of the receipt of the user and/or the transaction instrument or token information; successful enrollment of the user; successful update of the information stores, etc.

The above described method of enrolling users in a transaction verification system can be used for example by a company that has several employees and issues payroll checks to the employees. In this example, the users of the transaction verification system can be the employees. The employees can be enrolled in the transaction verification system at the time they accept employment with the company subscribing or using the transaction verification system. Subsequently, every time the company issues payroll checks to its employees, information associated with the payroll checks, such as the payee on the check, check number, amount of the check, etc. can be transmitted to the central processor 12.

When the user presents the payroll check for encashment, information from the payroll check and the biometric data of the user can be compared with the corresponding information stored in the one or more information stores and the results of the comparison can be used to accept or reject the payroll check. A person skilled in the art can recognize that the users can be enrolled in the transaction verification system only once and it is not required to transmit the user information every time a payroll check is issued to the user.

The above described method of enrolling and verifying transaction instruments or tokens can also be used by municipal, state and/or federal government agencies that provide assistance to the public such as unemployment benefits, food stamps, social security benefits, disability benefits, medical benefits, etc.

Figure 2:
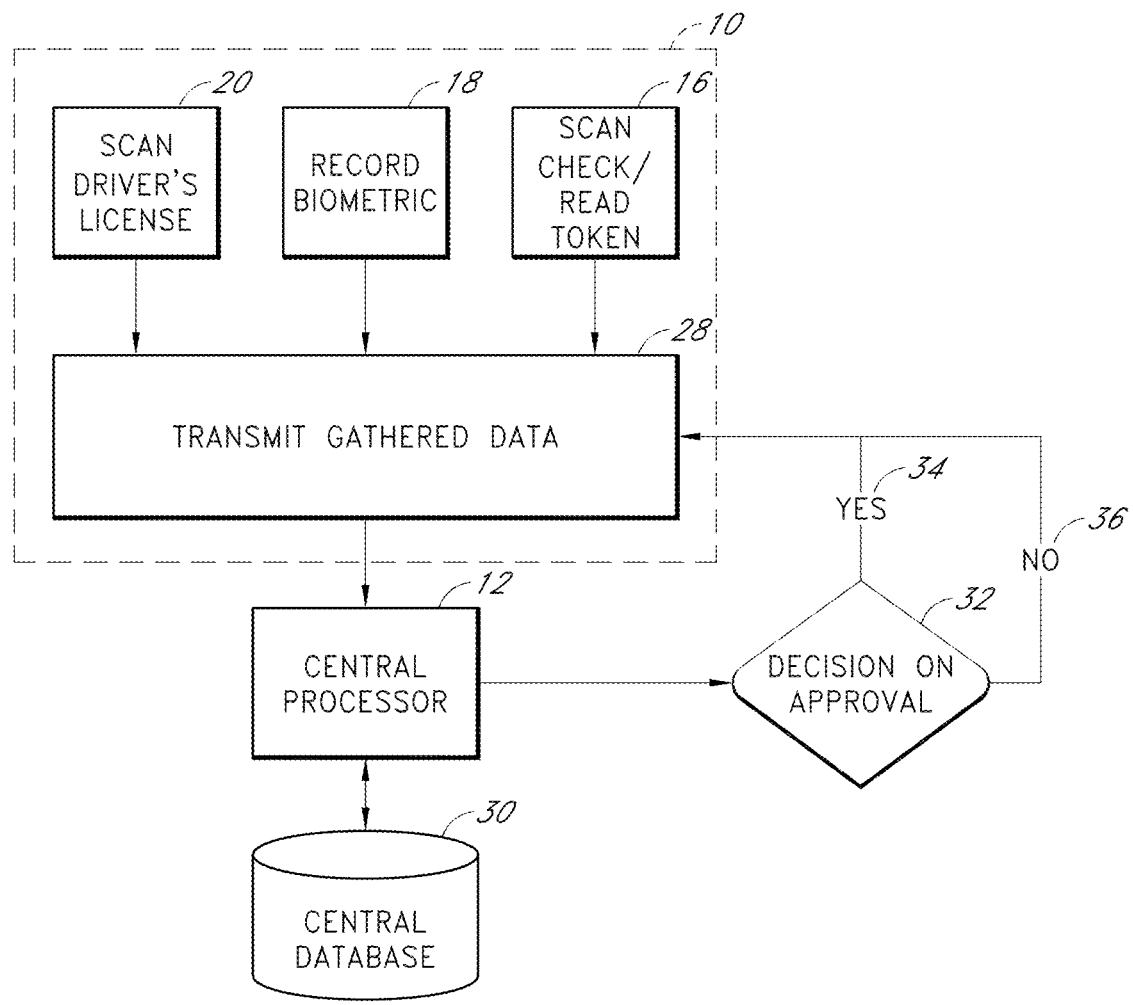
FIG. 2 is a block diagram illustrating an embodiment of the electronic transaction verification unit whereby the electronic transaction verification unit is in communication with a central database that returns an approval decision to the electronic transaction verification unit.

FIG. 2 illustrates an alternative embodiment of the electronic transaction verification unit 10 in communication with a central database 30 such that the central database 30 allows the data stream of the electronic transaction verification unit 10 to be acted upon by decision block 32 to determine if the token verification is approved or denied, and then returns the approval decision to the electronic transaction verification unit 10. In such embodiment, the computer platform receives, processes, and transmits the data of the various devices, shown by logic block 28, to the processor 12 for comparison with information stored in identification database 14 included in the central database 30, via a communications link, for a simple comparison step to determine approval. The central database 30 can include a customer account information database (i.e., transaction information database), a biometric database of known customer biometric data, as well as a separate database of known invalid users. The database of known invalid users can be established by correlating a biometric presented at a transaction location with a fraudulently obtained transaction token and storing the biometric as invalid.

At the central processor 12, the incoming data is compared, either in parallel with or separately with token identification data, with the existing known data for authorized users of accounts stored in central database 30, shown by decision block 32, and an approval is made as to whether or not to accept the token. Either a yes decision 34 or a no decision 36 on approval is then re-transmitted back to the computer hardware platform 28 of the check verification unit 10. While the check verification unit 10 is shown in communication with a processor 12 and database 30 remotely located thereto, it is not necessary that the central processing system 12 or the database 30 be located remotely to the electronic transaction verification unit 10. In fact, the electronic transaction verification unit 10 and central processing system 12 can be self-contained at the transaction location whereby the central database 30, or the account information and biometric databases are continually updated within the electronic transaction verification unit 10 through either a data connection to a master database or through periodic manual updates from storage media such as floppy disks or CD ROMs. In such an embodiment, the electronic transaction verification system is preferably self-contained and includes all the necessary devices for scanning drivers' licenses 20, gathering biometric data (e.g., fingerprints) 18, or scanning checks/reading tokens 16 (gathering check or token information data) within one unit including the system.

Figure 2A:
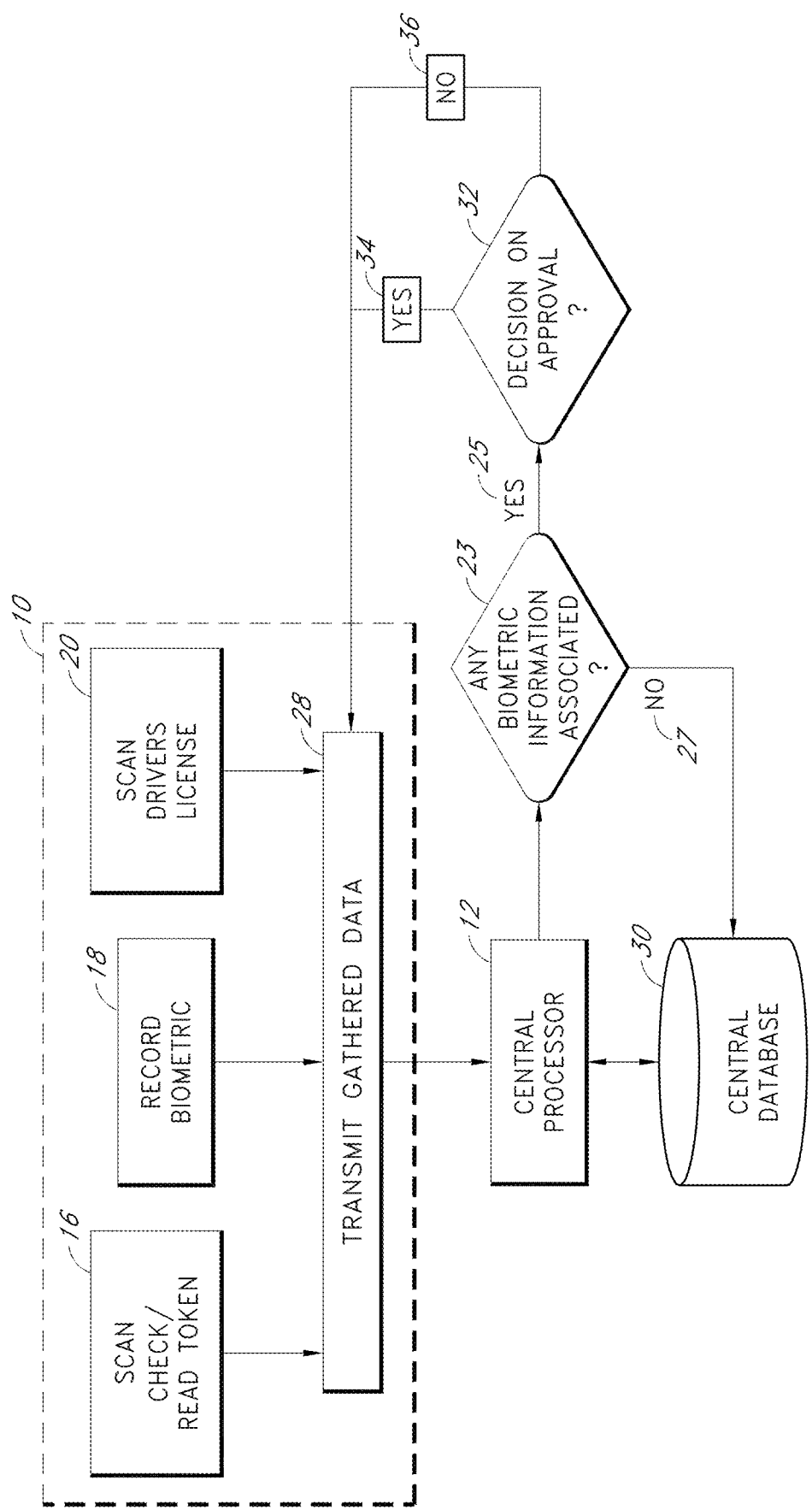
FIG. 2A is a block diagram illustrating an embodiment of the transaction verification system whereby the electronic transaction verification unit is in communication with a central database that associates biometric information with a transaction instrument and returns an approval decision to the electronic transaction verification unit.

FIG. 2A illustrates another embodiment of an electronic verification unit 10 wherein the central processor 12 is configured to associate biometric information obtained when a transaction instrument is presented to a verification system with an information encoded on a transaction instrument if no biometric information has been previously associated with the encoded information on the transaction instrument. For example, if the central processor 12 determines that no biometric information is associated with encoded transaction instrument information in the central database 30 (as shown in the logic block 23), then a NO decision 27 is made at the logic block 23. The central processor 12 then proceeds to associate the biometric information with the encoded information. If however, the central processor 12 determines that biometric information was previously associated with the encoded information, then the central processor 12 can proceed to make a decision on whether to accept or reject the transaction instrument (as shown in block 32). As discussed above, with reference to FIG. 2, either a YES decision 34 or a NO decision 36 on approval is then communicated to the computer hardware platform 28 of the check verification unit 10.

In some embodiments, if the encoded information and/or the biometric information obtained when the transaction instrument is presented to the verification system does not match the previously stored encoded information and/or biometric information which is associated with the transaction instrument, then the central processor 12 can add the transaction instrument information and the biometric information to an information store that includes a list of invalid users and/or transaction instruments.

Figure 3:
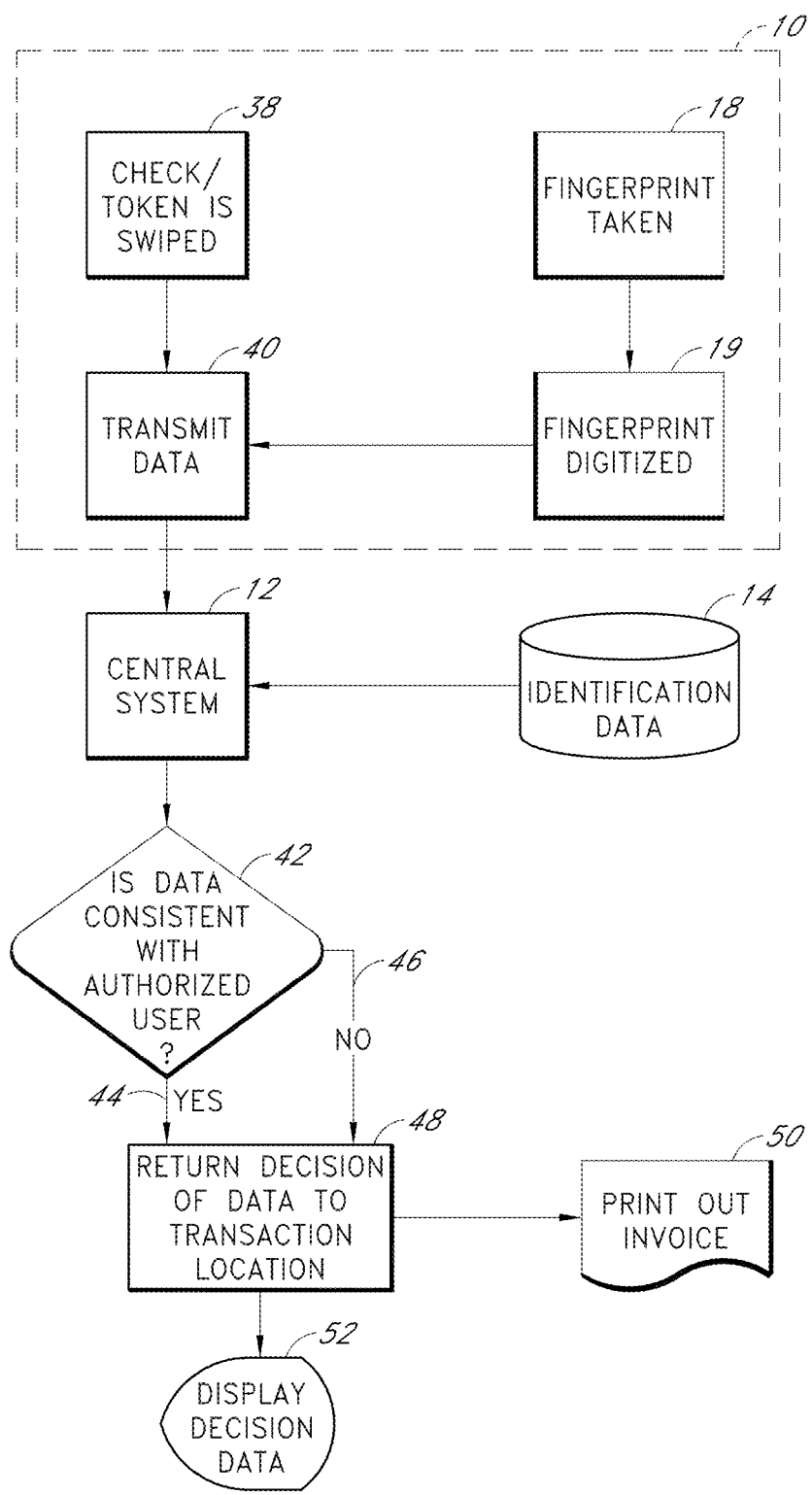
FIG. 3 is a flow chart of another embodiment of the verification system illustrating the electronic transaction verification unit transmitting the identifying data of a check and a fingerprint to the central system for processing.

FIG. 3 is a flow chart of an exemplary embodiment of the processing logic of the electronic transaction verification system showing the electronic transaction verification unit 10 where a check or token is swiped, shown by logic block 38, and a fingerprint is taken, shown by logic block 18, with the fingerprint then being digitized, shown by logic block 19. Both the check information data and the biometric fingerprint data are unified at the transmitting data platform, shown by logic block 40, for parallel transmission. The transmitted data then reaches the central processing system 12 that is in communication with a check or token account and biometric identification database 14 such that a decision is made within the central processing system 12 in regard to check or token approval. As discussed previously, the identification database 14 can include a plurality of databases used in the identification process. One of these is the biometric database of known customer data. An additional biometric database of known invalid users can also be established. The identification database 14 collectively refers to the one or more biometric databases. The central processing system 12 performs a decision determining if the check/token information and biometric data are consistent with an authorized user for the account against which the check is drafted or token is provided, shown by decision block 42, whereby a yes decision 44 or a no decision 46 is returned to the transaction location, shown by logic block 48. Upon return of the data from the central processing system 12, the data indicative of the decision is displayed, shown by display block 52, and/or a hard copy is printed out, shown by document block 50, indicative of the decision made, and alternatively, the grounds for acceptance or rejection.

Figure 4:
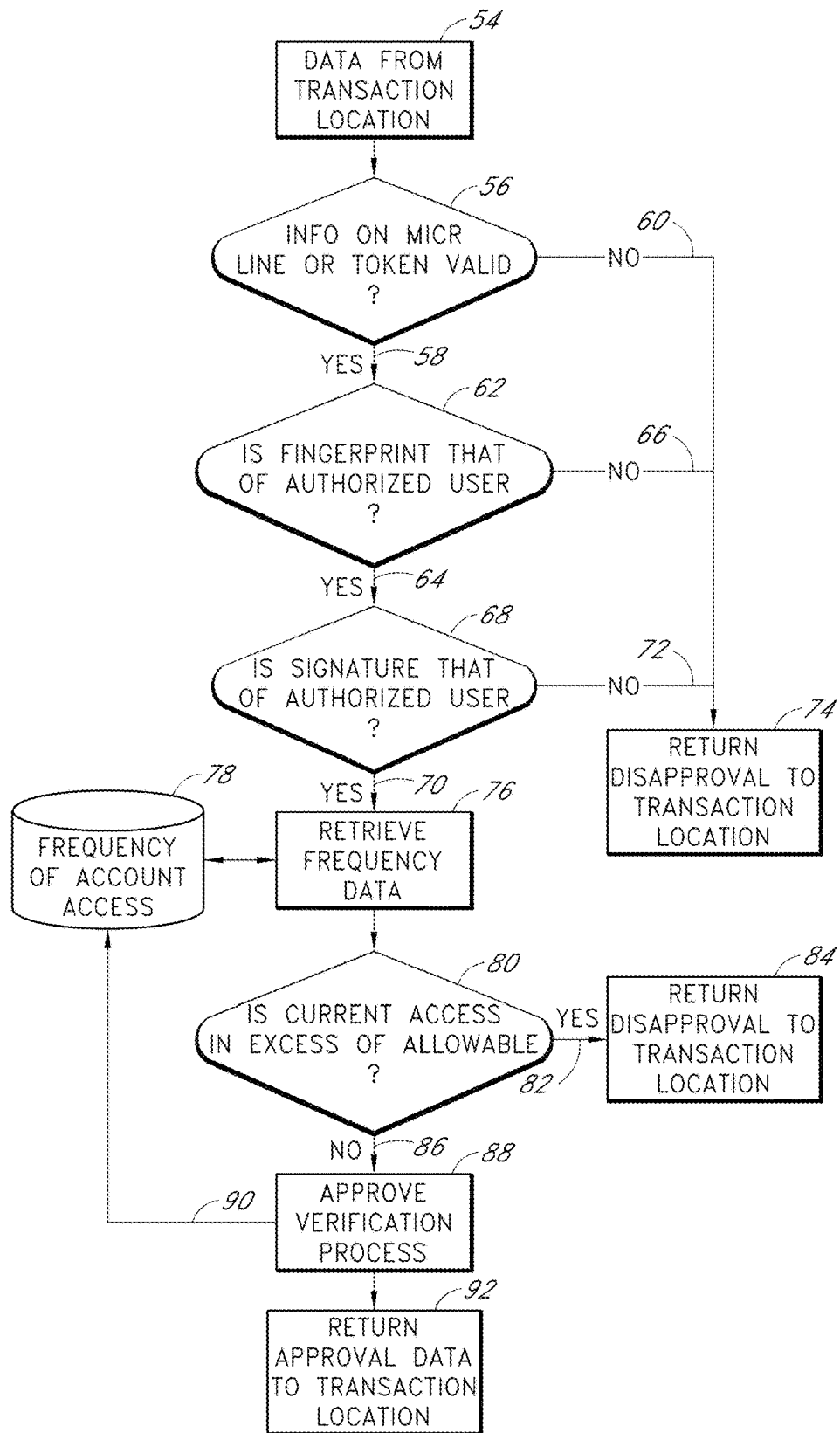
FIG. 4 is a flow chart illustrating the processing of transmitted data by the central system upon receipt of the data from the electronic transaction verification unit at the transaction location.

Various embodiments described herein accordingly utilize an inventive digital process whereby a dataset originates from the transaction location from the electronic transaction verification unit 10, shown by logic block 54, as shown in the processing logic flow chart of FIG. 4, and is preferably processed on the central processing system 12. A decision is made as to whether information on the MICR line (e.g., "ABA" number) or on the token is valid, shown by decision block 56, and then a decision is made as to whether the biometric data (e.g. fingerprint) is that of an authorized user, shown by decision block 62, Next, a decision (optional) is made as to whether the signature presented is that of an authorized user, shown by decision block 68. An authorized user is an individual authorized to use the system. An authorized user can be the account owner. An authorized user can also be the payee of a check, a subsequent payee or any other individual authorized to access an account in the system. Affirmative responses to these decisions in blocks 56, 62 and 68, shown by "yes" arrows 58, 64, and 70, respectively, preferably allow further processing of the data. Negative responses, shown by arrows 60, 66, and 72, respectively, preferably effect a return of data to the transaction location indicating that the transaction is disapproved, shown by block 74.

Once affirmative responses have been received to decisions 56, 62, and 68, then the data can be further processed by accessing a frequency of access database 78 which has information on accounts based upon the numbers of inquiries to the system for a specific account, shown by logic block 76, and such information is maintained and updated in the frequency of account access database, shown by database 78, which can be either integrated with or remote to the central processing system 12. Then a decision is made as to whether the current access is in excess of a predetermined allowable amount of access inquires to the system for a specific account, shown by decision block 80, and if the current access is in excess of the allowable pre-determined amount, shown by "yes" arrow 82, then the data is returned to the transaction location indicating that the requested access exceeds the allowable amount, shown by logic block 84, and thus that the transaction is disapproved. Otherwise, if the current access is not in excess of the allowable pre-determined amount, shown by "no" arrow 86, then the electronic transaction verification request is approved, shown by logic block 88. Other measures can also be used in lieu of, or in addition, to these steps, to verify the condition of the account. Several of the measures were identified above.

Upon approval, the information regarding approval is transmitted, shown by arrow 90, to the frequency of account access database 78 for updating of the records contained therein. The information regarding the approval of the electronic transaction is then returned to the transaction location and electronic transaction verification unit 10, shown by logic block 92.

The steps of the processes set forth in FIG. 4 are preferably performed by software being executed on the computer platform including the central processing system 12, located either at the transaction location and integrated with the electronic transaction verification unit 10, or located remotely thereto. One of skill in the art of computer programming can determine from the present disclosure and the flow charts disclosed herein the objects sufficient to write a program for the computer platform sufficient to perform the tasks as disclosed herein.

Figure 7:
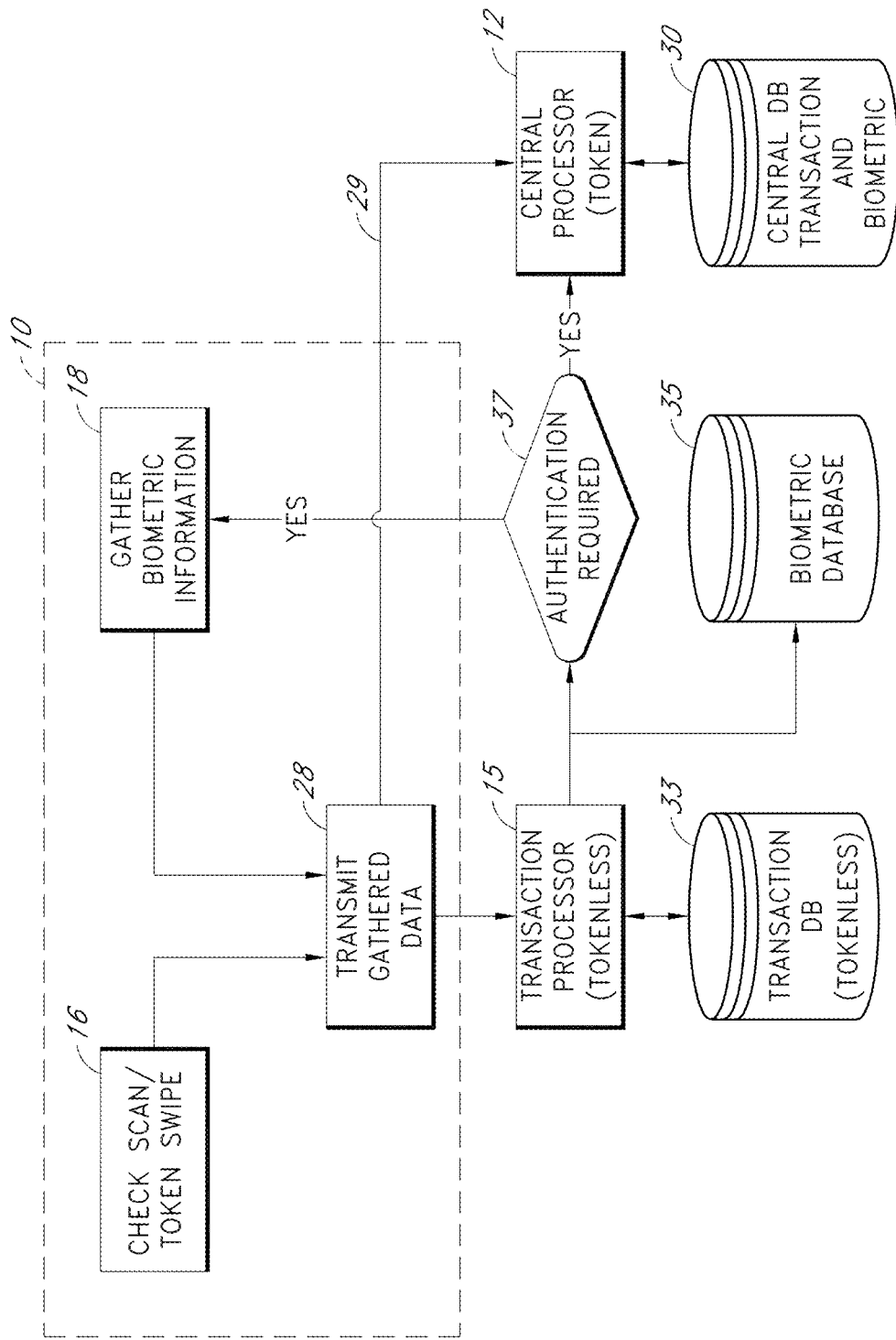
FIG. 7 illustrates an exemplary embodiment of the electronic transaction verification system including a verification unit operating in conjunction with a tokenless processing system having its own transaction and biometric databases.

In the exemplary embodiment illustrated in FIG. 7, the transaction database 33 and/or the biometric database 35 within a tokenless payment system can be used to verify or authenticate (decision block 37) the person presenting a token for payment at the transaction location. The token being presented at the transaction location is swiped (logic block 16) obtaining the necessary account information and sent to a processor 15 for comparison with account information stored in the transaction information database 33 within the tokenless processing system. If a match occurs with account information stored in the transaction database 33 of the tokenless system, the token system then requires the token to be authenticated by a biometric (decision block 37). The biometric information is gathered (logic block 18) and then sent either separately or in parallel with the transaction information (logic block 28) to the tokenless system for approval.

If the account information is sent to the tokenless system transaction processor 15 and there is no existing account in transaction database 33, then the transaction information would be processed by the normal procedures for handling the token at the transaction location by electronic verification unit 10. If the transaction location normally requires a biometric for the processing of a token then the check/token account information 16 and the biometric information 18 can be gathered at the onset of the transaction and the tokenless databases 33, 35 then would be additional databases that would be checked. The transaction information database 33 and the biometric database 35 can be the same databases for both token-based and tokenless systems. Likewise, the central processor 12 handling token-based transactions (arrow 29) can be a separate processor or the same processor handling the tokenless transactions.

Figure 5:
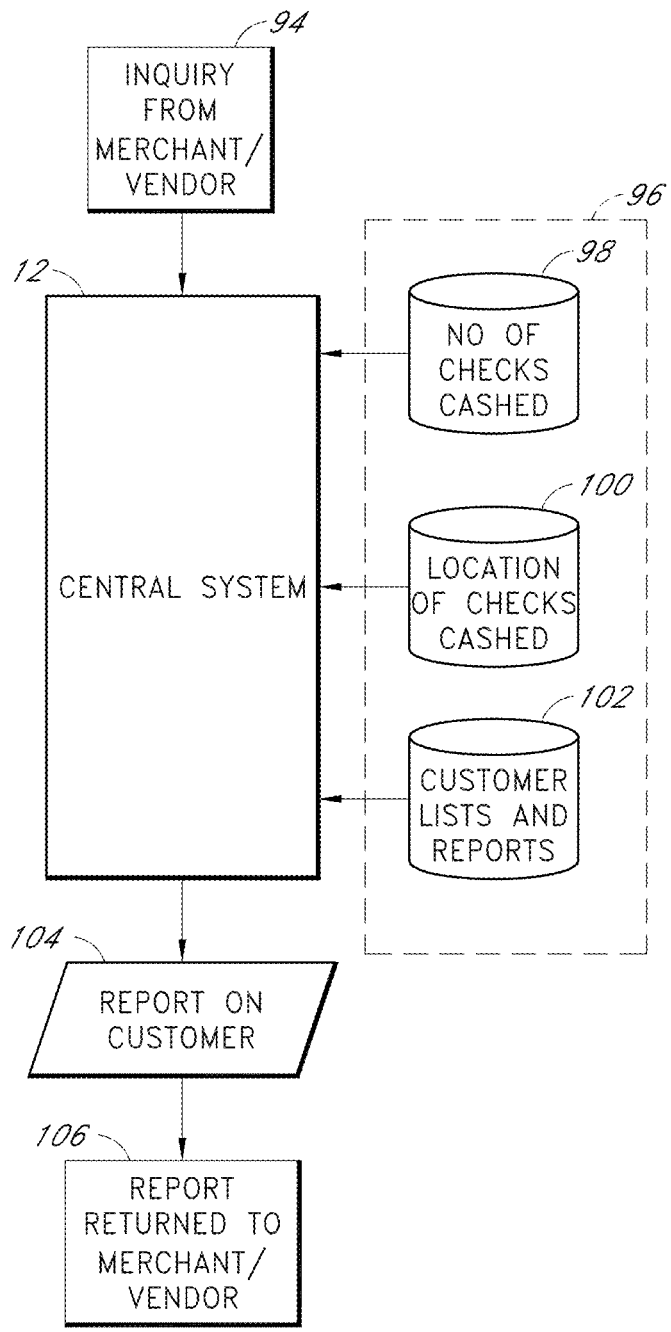
FIG. 5 is a block diagram illustrating the main system generating a customer report based upon receipt of an inquiry from a retailer.

In one embodiment, the electronic transaction verification system preferably includes the capability to return a report to a merchant/vendor upon request, as shown in FIG. 5. As so embodied, an inquiry and/or request is made from a merchant directed towards the central processing system 12, shown by logic block 94, which requests a specific report or series of reports. The central processing system 12 preferably includes access to a variety of databases 96, which preferably contains separate databases including a database indicative of a number of checks cashed for a given account, shown by database 98, locations of checks cashed for a specific account, shown by database 100, and a database containing various information regarding the customers of the account, shown by database 102. The central processing system 12 selectively accesses and interacts with these databases in response to the inquiry from the merchant at logic block 94, and generates a report on the specific customer or customers, shown by processed data logic block 104. The processed data then is returned in report form to the specific merchant, shown by logic block 106, which made the inquiry and request to generate the report. Such information generated by the verification system can prove highly informative as to customer trends such as drops in frequencies of purchases, customer dissatisfaction, or other trends that can then be effectively targeted by marketing efforts.

Figure 6:
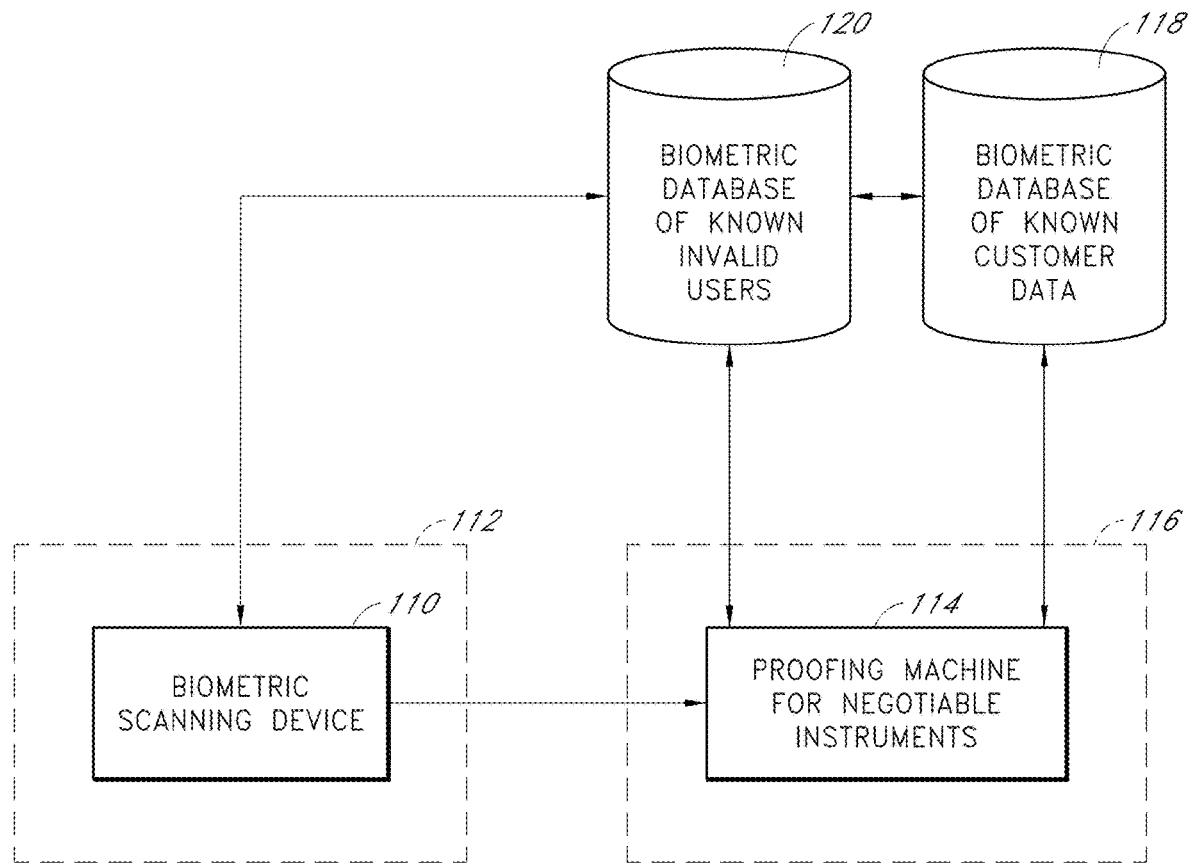
FIG. 6 is a block diagram illustrating a proofing machine interacting with the biometric data scanner at the transaction location, with the interrelation of a first biometric database for known customers and a second biometric database for known invalid data.

The present inventive electronic transaction verification system further provides that after the biometric identification data, such as a fingerprint, has been imprinted on the check, the system can alternately and/or additionally be used at a bank in conjunction with the proofing machine to determine if the biometric identification data on the check is that of the account owner. As shown in FIG. 6, the biometric data from the biometric scanning device 110, preferably at the transaction location 112, is sent, either electronically or physically, to the proofing machines for checks or negotiable instruments 114, typically at a bank processing center 116. In the past, checks were typically sent physically to a bank or processing center and the magnetic line of the check physically scanned by the proofing machine 114. Currently, many checks are being truncated electronically and the information contained therein is being processed directly or indirectly by host computers at the bank or processing centers.

In the embodiment shown in FIG. 6, the biometric data is printed on the check by the biometric scanning device 110 and the printed biometric data is scanned, and thus gathered, in addition to the magnetic numbers of the check. A comparison step preferably occurs within the proofing machine 114 during the batch processing and scanning of the magnetic numbers of the checks for transfer of funds from the accounts. The biometric data is retrieved and updated from a first biometric database 118 that contains the biometric data for known customers having accounts. The proofing machine 114 also preferably perform a comparison step with a second biometric database 120 containing biometric data for known invalid users who have perpetrated, or attempted to perpetrate, fraudulent activity with regard to tendering checks/negotiable instruments. Databases 118 and 120 can reside on the proofing machine 114, or can be located remotely. Such information in biometric database 120 is preferably also accessible by the biometric scanning device 110 at the transaction location 112 for updating and comparing, either separately from or in conjunction with, the proofing machine 114. If the check/negotiable instrument being compared was tendered fraudulently, the biometric database 120 is useful for determining the perpetrator's actual identity, and comparison between databases 118 and 120 can also be made for identity determination. In that regard, biometric database 120 is also accessible by central processing system 12, identification database 14, central database 30, as well as electronic transaction verification unit 10 for detection of known fraudulent users.

The embodiments described herein can be utilized in a variety of forms with a variety of sources of information other than those described in detail herein. As an example, the electronic transaction verification system can be interfaced to various transaction and identification information databases containing customer account information and biometric information.

While there have been shown a preferred and alternate embodiments of the electronic transaction verification system, it is to be understood that the electronic transaction verification system may be embodied otherwise than is herein specifically shown and described, and that within the embodiments, certain changes may be made in the form and arrangement of the parts without departing from the underlying ideas or principles of the embodiments of an electronic transaction verification system set forth in the claims appended herewith.

What is claimed is:

1. A system configured to process a payment transaction wirelessly with a reader associated at a point-of-sale location, the system comprising a computing device comprising:
   a scanner configured to capture facial features and a transaction token, wherein the transaction token is issued on behalf of an issuing entity; and
   one or more hardware processors configured to:
   receive biometric data corresponding to a user's feature from the scanner;
   compare the received biometric data with a stored biometric data associated with the user; and
   transmit, wirelessly to the reader directly from the computing device, a transaction token information representative of the transaction token based on the comparison indicating an approval of the received biometric data;
   wherein the transaction token information is representative of the transaction token, wherein the transaction token information is received responsive to a digitization of the transaction token with the scanner prior to processing the payment transaction and stored on a non-transitory memory of the computing device.

2. The system of claim 1, wherein the one or more hardware processors are further configured to receive a transaction comparison result conducted by a transaction validating entity to accept or reject a transaction and display a confirmation of the transaction based on the transaction comparison result.

3. The system of claim 1, wherein the transaction token is a physical object comprising one of a check, a debit card, a loyalty card, a food stamp, a token, or an account.

4. The system of claim 1, wherein the transaction token comprises a credit card.

5. The system of claim 1, further comprises a token reading device configured to read or scan an indication of the transaction token.

6. The system of claim 1, further comprising a second scanner configured to detect a fingerprint, wherein the fingerprint is used for authenticating some payment transactions.

7. The system of claim 1, wherein the facial features comprise a retinal scan.

8. A computing device configured to enable wireless radio frequency electronic payment transaction between the computing device and a reader associated at a point-of-sale location, the computing device comprising one or more hardware processors configured to process a transaction, said processing comprising:
   receiving encoded transaction token information representative of a transaction token responsive to a digitization of the transaction token captured with an integrated scanner;
   storing the received encoded transaction token information on the computing device;

receiving biometric data corresponding to a user's biometric feature;

comparing the received biometric data with a stored biometric data associated with the user; and transmitting, to the reader wirelessly from the computing device, the encoded transaction token information representative of the stored transaction token based on the comparison indicating an approval of the received biometric data.

9. The computing device of claim 8, wherein the one or more hardware processors are further configured to receive a transaction comparison result conducted by a transaction validating entity to accept or reject a transaction and display a confirmation of the transaction based on the transaction comparison result.

10. The computing device of claim 8, wherein the transaction token is a physical object comprising one of a check, a debit card, a loyalty card, a food stamp, a token, or an account.

11. The computing device of claim 8, wherein the transaction token comprises a credit card.

12. The computing device of claim 8, further comprises a token reading device configured to read or scan an indication of the transaction token.

13. The computing device of claim 8, further comprising a second scanner configured to detect a fingerprint.

14. The computing device of claim 8, wherein the integrated scanner is configured to detect a facial feature.

15. A method of processing a payment transaction wirelessly between a computing device and a reader associated at a point-of-sale location, the method comprising:

receiving encoded transaction token information representative of a transaction token responsive to a digitization of a transaction token captured with an integrated scanner;

storing the received transaction token information on the computing device;

receiving biometric data corresponding to a user's biometric feature;

comparing the received biometric data with a stored biometric data associated with the user; and transmitting, to the reader wirelessly from the computing device, the transaction token information representative of the stored transaction token based on the comparison indicating an approval of the received biometric data.

16. The method of claim 15, further comprising receiving a transaction comparison result conducted by a transaction validating entity to accept or reject a transaction and displaying a confirmation of the transaction based on the transaction comparison result.

17. The method of claim 15, wherein the transaction token is a physical object comprising one of a check, a debit card, a loyalty card, a food stamp, a token, or an account.

18. The method of claim 15, wherein the transaction token comprises a credit card.

19. The method of claim 15, further comprising a second scanner configured to detect a fingerprint.

20. The method of claim 15, wherein the integrated scanner is configured to detect a facial feature.

21. A system configured to process a payment transaction wirelessly with a reader associated at a point-of-sale location, the system comprising a computing device comprising:

a first scanner configured to capture a transaction token, wherein the transaction token is issued on behalf of an issuing entity;

a second scanner configured to capture a fingerprint feature of a user; and one or more hardware processors configured to:

receive biometric data corresponding to the fingerprint feature from the scanner;

compare the received biometric data with a stored biometric data associated with the user; and transmit, wirelessly to the reader directly from the computing device, a transaction token information representative of the transaction token based on the comparison indicating an approval of the received biometric data;

wherein the transaction token information is representative of the transaction token, wherein the transaction token information is received responsive to a digitization of the transaction token with the first scanner prior to processing the payment transaction and stored on a non-transitory memory of the computing device.

22. The system of claim 21, wherein the one or more hardware processors are further configured to receive a transaction comparison result conducted by a transaction validating entity to accept or reject a transaction and display a confirmation of the transaction based on the transaction comparison result.

23. The system of claim 21, wherein the transaction token is a physical object comprising one of a check, a debit card, a loyalty card, a food stamp, a token, or an account.

24. The system of claim 21, wherein the transaction token comprises a credit card.

* * * * *